US 6,726,965 B2

(12) United States Patent
Ito et al.

(10) Patent No.: US 6,726,965 B2
(45) Date of Patent: Apr. 27, 2004

(54) OPTICAL COMPENSATORY SHEET COMPRISING SUBSTRATE, ORIENTATION LAYER AND OPTICALLY ANISOTROPIC LAYER

(75) Inventors: Yoji Ito, Minami-ashigara (JP); Shigeki Yokoyama, Minami-ashigara (JP); Masayuki Negoro, Minami-ashigara (JP); Ken Kawata, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/331,505

(22) Filed: Dec. 31, 2002

(65) Prior Publication Data

US 2003/0137627 A1 Jul. 24, 2003

Related U.S. Application Data

(62) Division of application No. 09/374,201, filed on Aug. 2, 1999, now Pat. No. 6,606,140.

(30) Foreign Application Priority Data

Jul. 31, 1998 (JP) .......................................... 10-230254
Aug. 4, 1998 (JP) .......................................... 10-233563
Sep. 18, 1998 (JP) .......................................... 10-283409

(51) Int. Cl.$^7$ ............................................. C09K 19/00
(52) U.S. Cl. ........................ 428/1.2; 428/1.62; 428/1.6
(58) Field of Search .................... 428/1.1, 1.2, 1.25, 428/1.26, 1.27, 1.3, 1.61, 1.6, 1.62; 252/299.1; 349/1

(56) References Cited

U.S. PATENT DOCUMENTS

| | | | | | |
|---|---|---|---|---|---|
| 5,631,051 | A | * | 5/1997 | Ito ................................. | 428/1 |
| 5,747,121 | A | * | 5/1998 | Okazaki et al. ................ | 428/1 |
| 6,064,457 | A | * | 5/2000 | Aminaka ..................... | 349/117 |
| 6,245,398 | B1 | * | 6/2001 | Matsuoka et al. ........... | 428/1.3 |
| 6,380,996 | B1 | * | 4/2002 | Yokoyama et al. ......... | 349/117 |
| 6,485,798 | B1 | * | 11/2002 | Aminaka et al. ............ | 428/1.1 |
| 6,519,016 | B1 | * | 2/2003 | Ichihashi et al. ........... | 349/117 |

* cited by examiner

Primary Examiner—Mark F. Huff
Assistant Examiner—Jennifer R. Sadula
(74) Attorney, Agent, or Firm—Burns, Doane, Swecker & Mathis, L.L.P.

(57) ABSTRACT

An optical compensatory sheet comprises a transparent substrate, an orientation layer and an optically anisotropic layer in order. The optically anisotropic layer comprises discotic liquid crystal molecules. The orientation layer comprises a denatured polyvinyl alcohol having a hydrocarbon group containing 10 to 100 carbon atoms or a denatured polyvinyl alcohol containing fluorine atoms. The discotic liquid crystal molecules are aligned at an average inclined angle in the range of 50° to 90°. An orientation layer, a liquid crystal display of an STN mode and a method of alignment of discotic liquid crystal molecules are also disclosed.

9 Claims, 5 Drawing Sheets

OPTICAL COMPENSATORY SHEET COMPRISING SUBSTRATE, ORIENTATION LAYER AND OPTICALLY ANISOTROPIC LAYER

This application is a divisional of Application No. 09/374,201, filed on Aug. 2, 1999, now U.S. Pat. No. 6,606,140.

FIELD OF THE INVENTION

The present invention relates to an optical compensatory sheet comprising a transparent substrate, an orientation layer and an optically anisotropic layer comprising discotic liquid crystal molecules in order. The invention also relates to an orientation layer for liquid crystal. The invention further relates to a liquid crystal display of an STN mode. The invention furthermore relates to a process of alignment of discotic liquid crystal molecules at an average inclined angle in the range of 50° to 90°.

BACKGROUND OF THE INVENTION

A liquid crystal display of an STN mode comprises a liquid crystal cell of an STN (Super Twisted Nematic) mode, two polarizing elements arranged on each side of the liquid crystal cell, and one or two optical compensatory sheets (phase retarders) arranged between the liquid crystal cell and the polarizing element.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecule. Each of the substrates has an orientation layer, which has a function of aligning the rod-like liquid crystal molecule. The rod-like liquid crystal molecules are twisted by using a chiral agent. A twist angle of the molecules is in the range of 90° to 360°.

Without use of an optical compensatory sheet, a liquid crystal display of an STN mode displays an image colored blue or yellow because of birefringence of rod-like liquid crystal molecules. The blue or yellow color is inconvenient for not only a black and white image but also a color image. An optical compensatory sheet has a function of removing color from an image to display a bright and clear image. The optical compensatory sheet also has a function of enlarging a viewing angle of a liquid crystal cell. A stretched birefringent film has usually been used as the optical compensatory sheet. Japanese Patent Provisional Publication Nos. 7(1995)-104284 and 7(1995)-13021 disclose an optical compensatory sheet made of a stretched birefringent film for a liquid crystal display of an STN mode.

An optical compensatory sheet comprising an optically anisotropic layer on a transparent substrate has been proposed to be used in place of the stretched birefringent film. The optically anisotropic layer is formed by aligning discotic liquid crystal molecules and fixing the aligned molecules. The discotic liquid crystal molecules usually have large birefringence. The discotic liquid crystal molecules also have various alignment forms. Accordingly, an optical compensatory sheet obtained by using the discotic liquid crystal molecule has a specific optical characteristic that cannot be obtained by the conventional stretched birefringent film. The optical compensatory sheet using the discotic liquid crystal molecule is disclosed in Japanese Patent Provisional Publication No. 6(1994)-214116, U.S. Pat. Nos. 5,583,679, 5,646,703 and German Patent Publication No. 3,911,620A1. However, the disclosed optical compensatory sheet is designed to be used in a liquid crystal display of a TN (Twisted Nematic) mode.

The optical compensatory sheet containing the discotic liquid crystal molecules should be redesigned to be used in a liquid crystal display of an STN mode. In a liquid crystal cell of the STN mode, rod-like liquid crystal molecules are aligned according to a super twisted birefringent mode at a twist angle of larger than 90°. The liquid crystal display of the STN mode can display a clear image of a large volume according to a time-sharing addressing method even though the display has a simple matrix electrode structure (having no active matrix such as a thin film transistor or a diode).

The discotic liquid crystal molecules should be essentially vertically aligned (homogeneously aligned) to optically compensate the liquid crystal cell of the STN mode. The discotic liquid crystal molecules are preferably further twisted. Japanese Patent Provisional Publication No. 9(1997)-26572 discloses an optical compensatory sheet in which discotic liquid crystal molecules are twisted. The drawings of Japanese Patent Provisional Publication No. 9(1997)-26572 further illustrate that discotic liquid crystal molecules are essentially vertically aligned.

SUMMERY OF THE INVENTION

It is technically difficult to align discotic liquid crystal molecules uniformly (monodomain alignment) from an interface facing an orientation layer to another interface facing the air according to the disclosures of Japanese Patent Provisional Publication No. 9(1997)-26572. If the discotic liquid crystal molecules are not uniformly aligned, disclination of the molecules causes scattered light, which decreases a contrast ratio of a displayed image.

Rod-like liquid crystal molecules used in a liquid crystal cell have been investigated to align the molecule essentially vertically (homeotropic alignment). For example, a liquid crystal display of a vertical alignment (VA) mode uses an orientation layer having a function of essentially vertically aligning rod-like liquid crystal molecules. In the liquid crystal display of the VA mode, rod-like liquid crystal molecules are essentially vertically aligned while not applying voltage to the cell, and are essentially horizontally aligned while applying voltage to the cell. Various orientation layers have been proposed to align rod-like liquid crystal molecules.

Discotic liquid crystal molecules are completely different from the rod-like liquid crystal molecules in molecular structures and in optical characteristics. Most of the orientation layers having a function of aligning rod-like liquid crystal molecules are not effective in aligning discotic liquid crystal molecules.

An object of the present invention is to provide an optical compensatory sheet suitable for a liquid crystal display of an STN mode.

Another object of the invention is to provide an orientation layer having a function of aligning liquid crystal molecule (particularly discotic liquid crystal molecules) vertically.

A further object of the invention is to provide a liquid crystal display of an STN mode that can display a clear image of a high contrast, in which blue or yellow color caused by birefringence of rod-like liquid crystal molecule is reduced.

A furthermore object of the invention is to provide a method for vertical, uniform and stable alignment of discotic liquid crystal molecules.

The present invention provides an optical compensatory sheet comprising a transparent substrate, an orientation layer and an optically anisotropic layer in order, said optically anisotropic layer comprising discotic liquid crystal molecules, wherein the orientation layer comprises a denatured polyvinyl alcohol having a hydrocarbon group containing 10 to 100 carbon atoms, said discotic liquid crystal molecules being aligned at an average inclined angle in the range of 50° to 90°.

The invention further provides an orientation layer provided on a support, said orientation layer having a function of aligning liquid crystal, wherein the orientation layer comprises a denatured polyvinyl alcohol having a hydrocarbon group containing 10 to 100 carbon atoms.

The invention furthermore provides a liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in order, said transparent substrate being adjacent to the polarizing element, said optically anisotropic layer comprising discotic liquid crystal molecules, said orientation layer comprising a denatured polyvinyl alcohol having a hydrocarbon group containing 10 to 100 carbon atoms, and said discotic liquid crystal molecules being aligned at an average inclined angle in the range of 50° to 90°.

The invention still furthermore provides a method of alignment of discotic liquid crystal molecules, which comprises forming an optically anisotropic layer comprising discotic liquid crystal molecules on an orientation layer comprising a denatured polyvinyl alcohol having a hydrocarbon group containing 10 to 100 carbon atoms to align the discotic liquid crystal molecules at an average inclined angle in the range of 50° to 90°.

The invention also provides an optical compensatory sheet comprising a transparent substrate, an orientation layer and an optically anisotropic layer in order, said optically anisotropic layer comprising discotic liquid crystal molecules, wherein the orientation layer comprises a denatured polyvinyl alcohol containing fluorine atoms, said discotic liquid crystal molecules being aligned at an average inclined angle in the range of 50° to 90°.

The invention further provides an orientation layer provided on a support, said orientation layer having a function of aligning liquid crystal, wherein the orientation layer comprises a denatured polyvinyl alcohol containing fluorine atoms.

The invention furthermore provides a liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in order, said transparent substrate being adjacent to the polarizing element, said optically anisotropic layer comprising discotic liquid crystal molecules, said orientation layer comprising a denatured polyvinyl alcohol containing fluorine atoms, and said discotic liquid crystal molecules being aligned at an average inclined angle in the range of 50° to 90°.

The invention still furthermore provides a method of alignment of discotic liquid crystal molecules, which comprises forming an optically anisotropic layer comprising discotic liquid crystal molecules on an orientation layer comprising a denatured polyvinyl alcohol containing fluorine atoms to align the discotic liquid crystal molecules at an average inclined angle in the range of 50° to 90°.

In the present specification, the term "average inclined angle" means an average of angles between discotic planes of discotic liquid crystal molecules (or long axes of rod-like liquid crystal molecules) and a surface of a transparent substrate (or a surface of an orientation layer). The present specification refers to alignment of liquid crystal molecules at an average inclined angle in the range of 50° to 90° as essentially vertical alignment of the molecules.

The applicants have succeeded in obtaining essentially vertical, uniform and stable alignment of liquid crystal molecules by using an orientation layer comprising a denatured polyvinyl alcohol having a hydrocarbon group containing 10 to 100 carbon atoms or a denatured polyvinyl alcohol containing fluorine atoms. The orientation layer is particularly effective in aligning discotic liquid crystal molecule.

An optical compensatory sheet suitable for a liquid crystal display of an STN mode is now obtained by using the discotic liquid crystal molecules of the essentially vertical, uniform and stable alignment. Thus, blue or yellow color is reduced in a liquid crystal display of an STN mode to display a clear image of a high contrast by using an optical compensatory sheet, in which the discotic liquid crystal molecules are essentially vertically aligned (and preferably twisted).

Figure 3A:
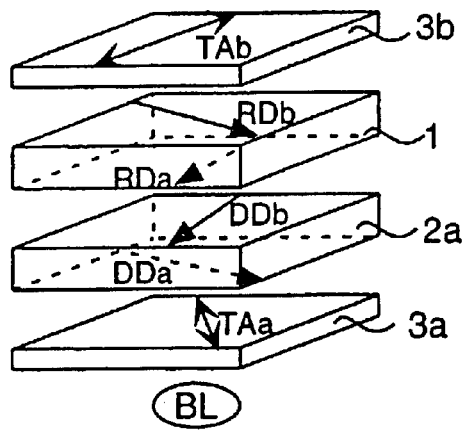
FIG. 3 schematically illustrates a layered structure of a liquid crystal display of an STN mode.

The liquid crystal display shown in FIG. 3A comprises a backlight (BL), a lower polarizing element (3a), a lower optical compensatory sheet (2a), a liquid crystal cell of an STN mode (1) and an upper polarizing element (3b) in order.

Figure 3B:
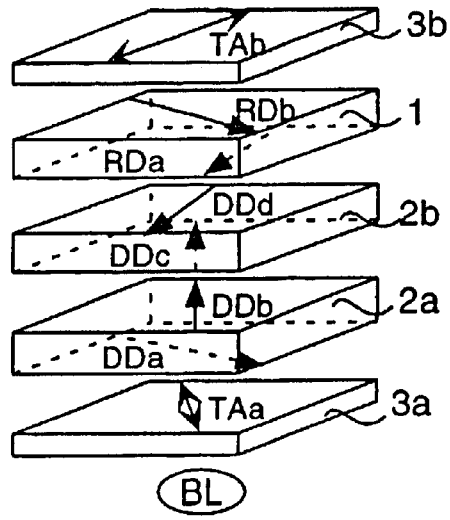

The liquid crystal display shown in FIG. 3B comprises a backlight (BL), a lower polarizing element (3a), a lower optical compensatory sheet (2a), and upper optical compensatory sheet (2b), a liquid crystal cell of an STN mode (1) and an upper polarizing element (3b) in order.

Figure 3C:
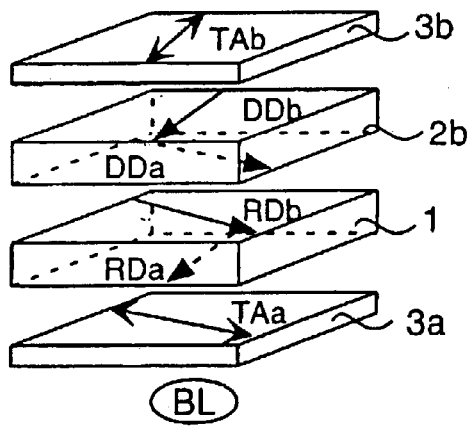

The liquid crystal display shown in FIG. 3C comprises a backlight (BL), a lower polarizing element (3a), a liquid crystal cell of an STN mode (1), an upper optical compensatory sheet (2b) and an upper polarizing element (3b) in order.

Figure 3D:
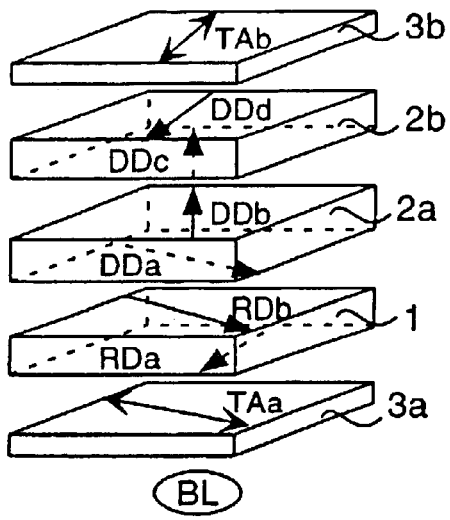

The liquid crystal display shown in FIG. 3D comprises a backlight (BL), a lower polarizing element (3a), a liquid crystal cell of an STN mode (1), a lower optical compensatory sheet (2a), an upper optical compensatory sheet (2b) and an upper polarizing element (3b) in order.

Figure 3E:
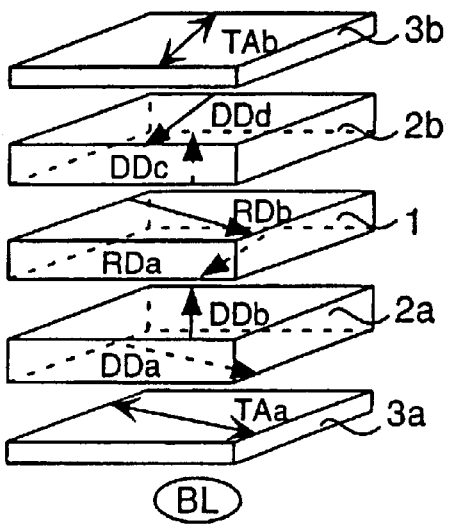

The liquid crystal display shown in FIG. 3E comprises a backlight (BL), a lower polarizing element (3a), a lower optical compensatory sheet (2a), a liquid crystal cell of an STN mode (1), an upper optical compensatory sheet (2b) and an upper polarizing element (3b) in order.

FIG. 4 is a plane view showing preferred optical directions about elements of a liquid crystal display of an STN mode.

Figure 4A:
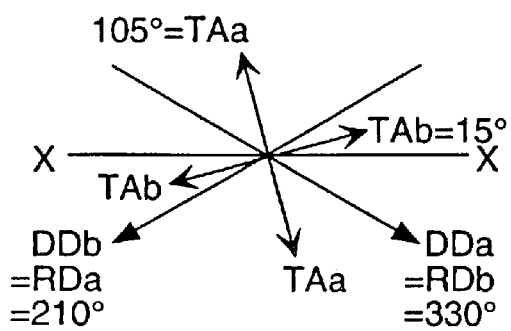

FIG. 4A shows a liquid crystal display comprising one optical compensatory sheet between a lower polarizing element and a liquid crystal cell of an STN mode, as is shown in FIG. 3A.

Figure 4B:
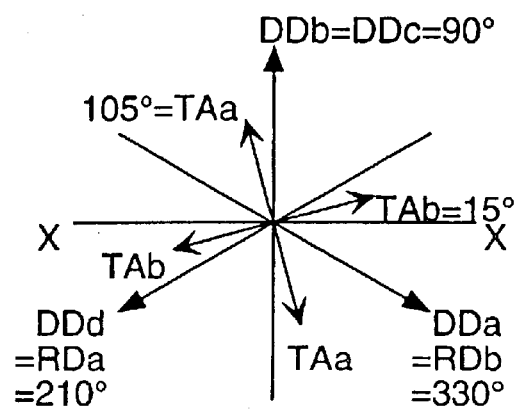

FIG. 4B shows a liquid crystal display comprising two optical compensatory sheets between a lower polarizing element and a liquid crystal cell of an STN mode, as is shown in FIG. 3B.

Figure 4C:
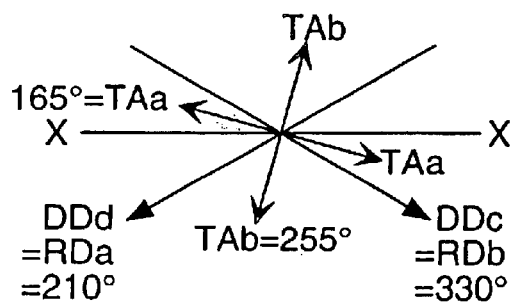

FIG. 4C shows a liquid crystal display comprising one optical compensatory sheet between a liquid crystal cell of an STN mode and an upper polarizing element, as is shown in FIG. 3C.

Figure 4D:
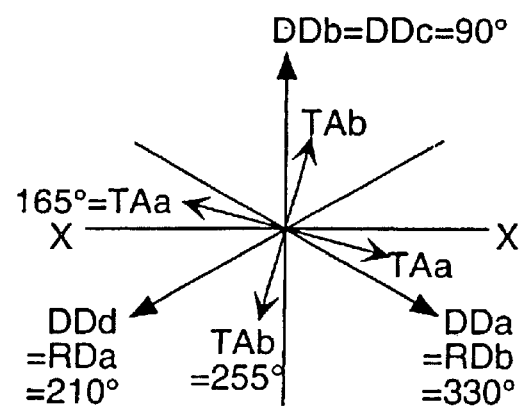

FIG. 4D shows a liquid crystal display comprising two optical compensatory sheets between a liquid crystal cell of an STN mode and an upper polarizing element, as is shown in FIG. 3D.

Figure 4E:
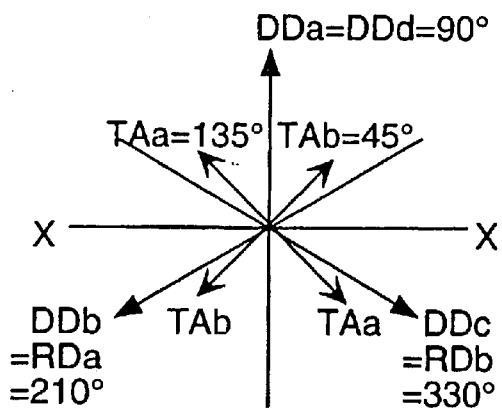

FIG. 4E shows a liquid crystal display comprising one optical compensatory sheet between a lower polarizing element and a liquid crystal cell of an STN mode, and another optical compensatory sheet between the liquid crystal cell and an upper polarizing element, as is shown in FIG. 3E.

FIG. 5 is a plane view showing other preferred optical directions about elements of a liquid crystal display of an STN mode.

Figure 5A:
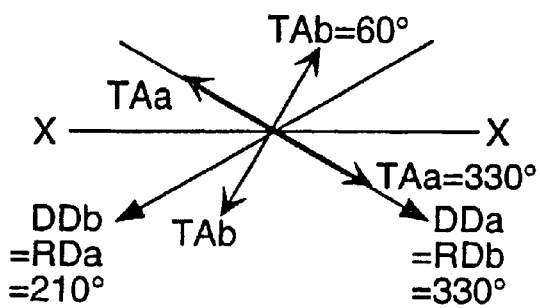

FIG. 5A shows a liquid crystal display comprising one optical compensatory sheet between a lower polarizing element and a liquid crystal cell of an STN mode, as is shown in FIG. 3A.

Figure 5B:
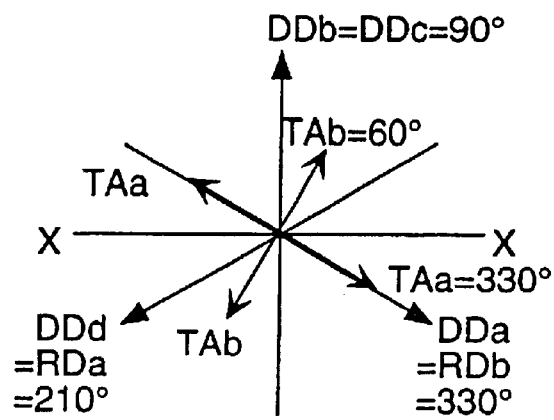

FIG. 5B shows a liquid crystal display comprising two optical compensatory sheets between a lower polarizing element and a liquid crystal cell of an STN mode, as is shown in FIG. 3B.

Figure 5C:
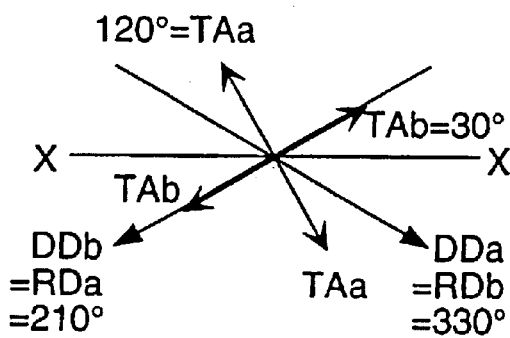

FIG. 5C shows a liquid crystal display comprising one optical compensatory sheet between a liquid crystal cell of an STN mode and an upper polarizing element, as is shown in FIG. 3C.

Figure 5D:
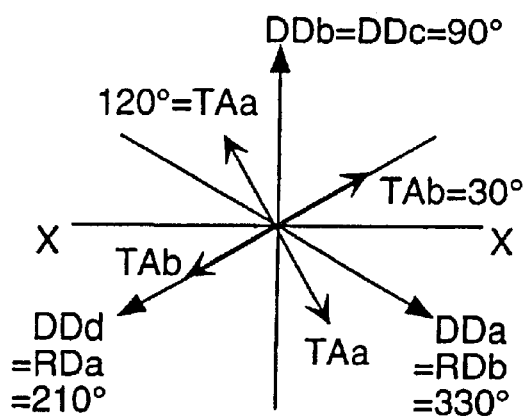

FIG. 5D shows a liquid crystal display comprising two optical compensatory sheets between a liquid crystal cell of an STN mode and an upper polarizing element, as is shown in FIG. 3D.

Figure 5E:
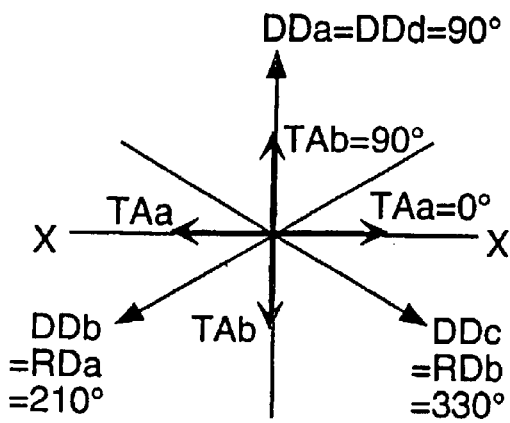

FIG. 5E shows a liquid crystal display comprising one optical compensatory sheet between a lower polarizing element and a liquid crystal display of an STN mode, and another optical compensatory sheet between the liquid crystal cell and an upper polarizing element, as is shown in FIG. 3E.

DETAILED DESCRIPTION OF THE INVENTION

Figure 1:
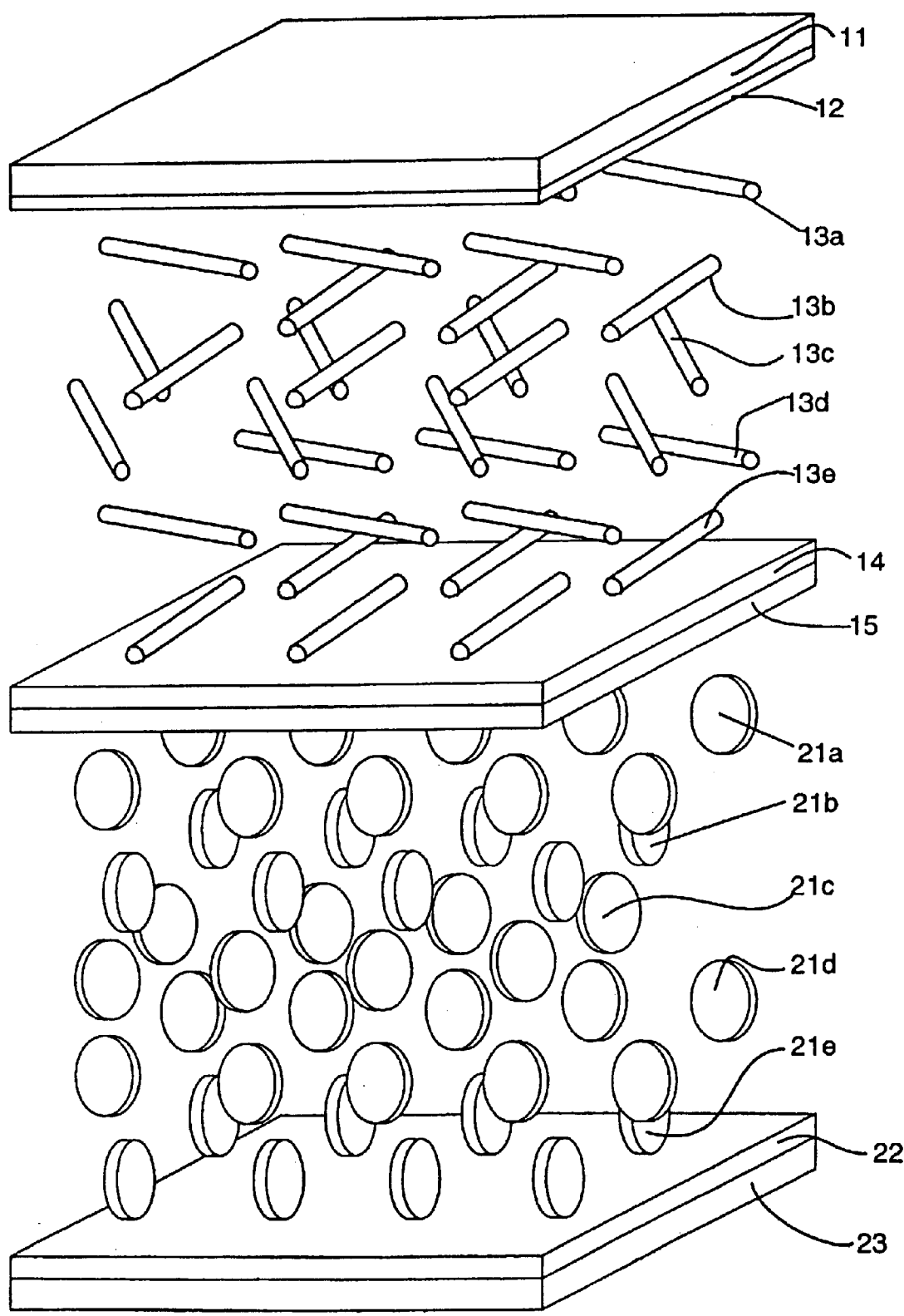
FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

As is shown in FIG. 1, a liquid crystal cell (11 to 15) comprises an upper substrate (11) having an upper orientation layer (12), a lower substrate (15) having a lower orientation layer (14) and a liquid crystal layer comprising rod-like liquid crystal molecules (13a to 13e) sealed between the orientation layers (12 & 14). The rod-like liquid crystal molecules (13a to 13e) are aligned by functions of the orientation layers (12 & 14), and are twisted by a function of a chiral agent (not shown) contained in the liquid crystal layer.

Each of the upper substrate (11) and the lower substrate (15) has an electrode (not shown), which has a function of applying voltage to the rod-like liquid crystal molecules (13a to 13e).

When voltage is not applied to the liquid crystal cell of an STN mode (off), the rod-like liquid crystal molecules (13a to 13e) are essentially horizontally aligned parallel to the surface of the orientation layers (12 & 14), as is shown in FIG. 1. The rod-like liquid crystal molecules (13a to 13e) are twisted along a thickness direction, and spiral on a plane (counterclockwise about 240° from 13a to 13e in FIG. 1).

When voltage is applied to the liquid crystal cell of an STN mode (on), rod-like liquid crystal molecules placed in the middle of the cell (13b to 13d) are rather vertically aligned (realigned parallel to a direction of an electric field), compared with FIG. 1 (off). On the other hand, the alignment of the other rod-like liquid crystal molecules (13a, 13e) neighboring the substrates (11, 15) is not essentially changed after applying voltage to the cell.

An optical compensatory sheet is provided under the liquid crystal cell. The optical compensatory sheet shown in FIG. 1 comprises a transparent substrate (23), an orientation layer (22) and an optically anisotropic layer in order. The optically anisotropic layer is formed by aligning discotic liquid crystal molecules (21a to 21e) and fixing the molecules while keeping the alignment.

According to the present invention, discotic liquid crystal molecules (21a to 21e) are so aligned that discotic planes of the molecules are essentially perpendicular to a surface of the orientation layer (22). The discotic liquid crystal molecules (21a to 21e) are preferably twisted along a thickness direction, and spiral on a plane (clockwise about 240° from 21a to 21e in FIG. 1).

In FIG. 1, alignment of each of the rod-like liquid crystal molecules corresponds to alignment of each of the discotic liquid crystal molecules, namely 13a to 21e, 13b to 21d, 13c to 21c, 13d to 21b and 13e to 21a.

Accordingly, the discotic liquid crystal molecule 21e optically compensates the rod-like liquid crystal molecule 13a, 21d compensates 13b, 21c compensates 13c, 21b compensates 13d, and 21a compensates 13e. The optical relation between the rod-like liquid crystal molecule and the discotic liquid crystal molecule is described below referring to FIG. 2.

Figure 2:
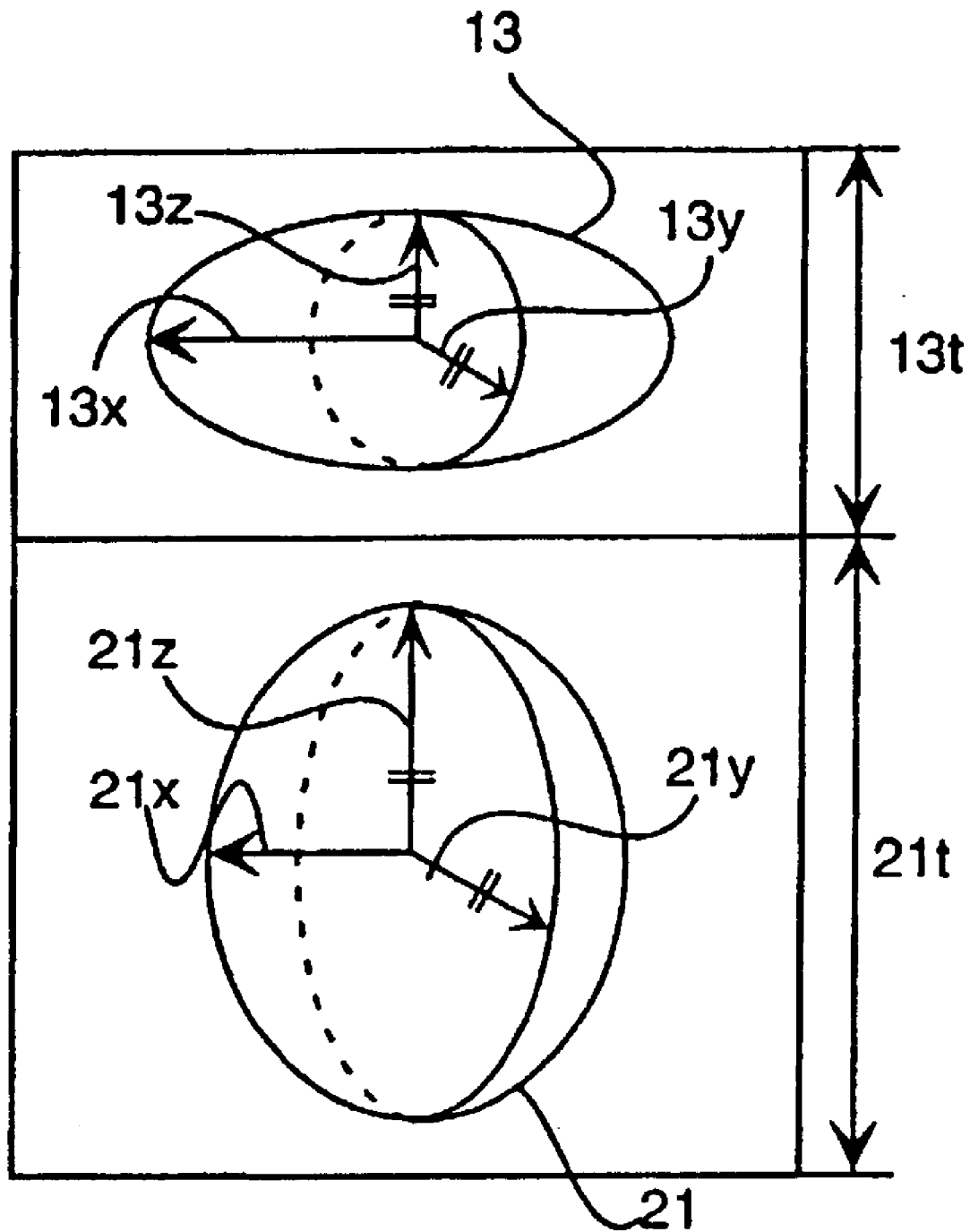
FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

The refractive index ellipsoid (13) of a rod-like liquid crystal molecule in a liquid crystal cell is formed by refractive indices (13x, 13y) in plane parallel to an orientation layer and a refractive index (13z) along a thickness direction. In a liquid crystal cell of an STN mode, the refractive index (13x) along one direction in place is relatively large, while the index (13y) along a direction perpendicular to the direction of (13x) is relatively small. The refractive index (13z) along the direction is also relatively small in a liquid crystal cell of an STN mode. Therefore, the refractive index ellipsoid (13) has a shape like a laid football, as is shown in FIG. 2. The liquid crystal cell having the refractive index ellipsoid (not spherical) shows a birefringence depending on a viewing angle. The dependency on the viewing angle is canceled by an optical compensatory sheet.

The refractive index ellipsoid (21) of a discotic liquid crystal molecule in an optical compensatory sheet is also formed by refractive indices (21x, 21y) in plane parallel to an orientation layer and a refractive index (21z) along a thickness direction. The refractive index (21x) along one direction in place is relatively small, while the index (21y) along a direction perpendicular to the direction of (21x) is relatively small. The refractive index (121z) along the direction is also relatively large. These refractive indices are obtained by aligning a discotic liquid crystal molecule essentially vertically. Therefore, the refractive index ellipsoid (21) has a shape like a standing disk, as is shown in FIG. 2.

A retardation formed in a liquid crystal cell (1) can be compensated by a retardation formed in an optical compensatory sheet (2) because of the above-described relation. The dependency on a viewing angle of the liquid crystal cell can be canceled by adjusting optical characteristics of a rod-like liquid crystal molecule and a discotic liquid crystal molecule that has a director having the same direction as the director of the rod-like liquid crystal molecule. In more detail, the dependency on a viewing angle can be canceled by adjusting refractive indices (13x, 13y, 13z) of a rod-like liquid crystal molecule, refractive indices (21x, 21y, 21z) of a discotic liquid crystal molecule, a thickness (13t) of the rod-like liquid crystal molecule layer and a thickness (21t) of the discotic liquid crystal molecule layer according to the following formulas.

$$|(13x-13y) \times 13t| = |(21x \times 21y) \times 21t|$$

$$|(13x-13z) \times 13t| = |(21x-21z) \times 21t|$$

FIG. 3 schematically illustrates a layered structure of a liquid crystal display of an STN mode.

The liquid crystal display shown in FIG. 3(a) comprises a backlight (BL), a lower polarizing element (3a), a lower optical compensatory sheet (2a), a liquid crystal cell of an STN mode (1) and an upper polarizing element (3b) in order.

The liquid crystal display shown in FIG. 3(b) comprises a backlight (BL), a lower polarizing element (3a), a lower optical compensatory sheet (2a), an upper optical compensatory sheet (2b), a liquid crystal cell of an STN mode (1) and an upper polarizing element (3b) in order.

The liquid crystal display shown in FIG. 3(c) comprises a backlight (BL), a lower polarizing element (3a), a liquid crystal cell of an STN mode (1), an upper optical compensatory sheet (2b) and an upper polarizing element (3b) in order.

The liquid crystal display shown in FIG. 3(d) comprises a backlight (BL), a lower polarizing element (3a), a liquid crystal cell of an STN mode (1), a lower optical compensatory sheet (2a), an upper optical compensatory sheet (2b) and an upper polarizing element (3b) in order.

The liquid crystal display shown in FIG. 3(e) comprises a backlight (BL), a lower polarizing element (3a), a lower optical compensatory sheet (2a), a liquid crystal cell of an STN mode (1), an upper optical compensatory sheet (2b) and an upper polarizing element (3b) in order.

FIG. 3 shows arrows, which indicate the following optical directions.

TAa: Transparent axis (TAa) of a lower polarizing element (3a)
DDa: Normal (director's) direction of a discotic plane of a discotic liquid crystal molecule adjacent to an orientation layer in a lower optical compensatory sheet (2a)
DDb: Normal (director's) direction of a discotic plane of a discotic liquid crystal molecule adjacent to a liquid crystal cell in a lower optical compensatory sheet (2a)
RDa: Rubbing direction of a lower orientation layer of a liquid crystal cell (1)
RDb: Rubbing direction of an upper orientation layer of a liquid crystal cell (1)
DDc: Normal (director's) direction of a discotic plane of a discotic liquid crystal molecule adjacent to a liquid crystal cell in an upper optical compensatory sheet (2b)
DDd: Normal (director's) direction of a discotic plane of a discotic liquid crystal molecule adjacent to an orientation layer in an upper optical compensatory sheet (2b)
TAa: Transparent axis (TAa) of an upper polarizing element (3b)

The angles between the optical directions are described below referring to FIG. 4 and FIG. 5.

FIG. 4 is a plane view showing preferred optical directions about elements of a liquid crystal display of an STN mode. FIG. 4 shows arrangements taking account of a front contrast.

FIG. 4(a) shows a liquid crystal display comprising one optical compensatory sheet between a lower polarizing element and a liquid crystal cell of an STN mode, as is shown in FIG. 3(a).

FIG. 4(b) shows a liquid crystal display comprising two optical compensatory sheets between a lower polarizing element and a liquid crystal cell of an STN mode, as is shown in FIG. 3(b).

FIG. 4(c) shows a liquid crystal display comprising one optical compensatory sheet between a liquid crystal cell of an STN mode and an upper polarizing element, as is shown in FIG. 3(c).

FIG. 4(d) shows a liquid crystal display comprising two optical compensatory sheets between a liquid crystal cell of an STN mode and an upper polarizing element, as is shown in FIG. 3(d).

FIG. 4(e) shows a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 4, the line (X) means a standard direction (0°). The arrows shown in FIG. 4 have the same meanings as is described about FIG. 3. The transparent axis of the lower polarizing element (TAa) and the transparent axis of the upper polarizing element (TAb) can be replaced with each other.

FIG. 5 is a plane view showing other preferred optical directions about elements of a liquid crystal display of an STN mode. FIG. 5 shows arrangements taking account of color of a displayed image.

FIG. 5(a) shows a liquid crystal display comprising one optical compensatory sheet between a lower polarizing element and a liquid crystal cell of an STN mode, as is shown in FIG. 3(a).

FIG. 5(b) shows a liquid crystal display comprising two optical compensatory sheets between a lower polarizing element and a liquid crystal cell of an STN mode, as is shown in FIG. 3(b).

FIG. 5(c) shows a liquid crystal display comprising one optical compensatory sheet between a liquid crystal cell of an STN mode and an upper polarizing element, as is shown in FIG. 3(c).

FIG. 5(d) shows a liquid crystal display comprising two optical compensatory sheets between a liquid crystal cell of an STN mode and an upper polarizing element, as is shown in FIG. 3(d).

FIG. 5(e) shows a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 5, the line (X) means a standard direction (0°). The arrows shown in FIG. 5 have the same meanings as is described about FIG. 3. The transparent axis of the lower polarizing element (TAa) and the transparent axis of the upper polarizing element (TAb) can be replaced with each other.

[Transparent Substrate]

A transparent substrate is preferably made of a polymer film, which more preferably is optical isotropic. The term "transparent" means that light transmittance is not less than 80%. The term "optical isotropic" means that a retardation in plane (Re) of the film is not more than 20 nm, preferably not more than 10 nm, and more preferably not more than 5 nm. A retardation along a thickness direction (Rth) of the film is preferably not more than 100 nm, more preferably not more than 50 nm, and most preferably not more than 30 nm. The Re and Rth retardation values are defined by the following formulas.

$$Re = (nx - ny) \times d$$

$$Rth = [\{(nx+ny)/2\} - nz] \times d$$

in which each of nx and ny is a refractive index in plane of the transparent substrate; nz is a refractive index along a thickness direction of the transparent substrate; and d is a thickness of a transparent substrate.

Examples of the polymers include cellulose ester, polycarbonate, polysulfone, polyethersulfone, polyacrylate and polymethacrylate. Cellulose ester is preferred, cellulose acetate is more preferred, and cellulose triacetate is most preferred. The polymer film is formed preferably according to a solvent casting method.

The transparent substrate has a thickness preferably in the range of 20 to 500 μm, and more preferably in the range of 50 to 200 μm.

The transparent substrate can be subjected to a surface treatment (e.g., glow discharge treatment, corona discharge treatment, ultraviolet (UV) treatment, flame treatment) to improve adhesion to a layer formed on the substrate (e.g., adhesive layer, orientation layer, optically anisotropic layer). An adhesive layer (undercoating layer) can be provided on the transparent substrate.

[Orientation Layer]

In the present invention, the orientation layer comprises a denatured polyvinyl alcohol having a hydrocarbon group containing 10 to 100 carbon atoms or a denatured polyvinyl alcohol containing fluorine atoms. The hydrocarbon group or the fluorine atoms are preferably present at a side chain of the denatured polyvinyl alcohol.

According to study of the applicants, liquid crystal molecules (particularly discotic liquid crystal molecules) can be essentially vertically aligned by a function of a side chain (rather than a main chain) of a polymer contained in an orientation layer. A functional group of the side chain decreases a surface energy of the orientation layer to erect a liquid crystal molecule. A hydrocarbon group containing 10 to 100 carbon atoms can be effectively used as the functional group. Fluorine atom can also be effectively used as the functional group. The hydrocarbon group or fluorine atom is introduced into a side chain of a polymer to arrange the group or the atom on the surface of the orientation layer.

The hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group contains 10 to 100 carbon atoms, preferably 10 to 60 carbon atoms, and more preferably 10 to 40 carbon atoms.

The hydrocarbon group preferably has a steroid structure. The steroid structure has an excluded volume effect as well as the above-described function of decreasing a surface energy of the orientation layer. Liquid crystal molecules can be strongly elected by the combination of the excluded volume effect and the function of decreasing the surface energy. In the present specification, the steroid structure means a cyclopentanohydrophenanthrene ring or a ring obtained by replacing a single bond of the cyclopentanohydrophenanthrene ring with a double bond so long as the ring is aliphatic (not forming an aromatic ring). The hydrocarbon group having the steroid structure preferably contains 18 to 100 carbon atoms, more preferably contains 19 to 60 carbon atoms, and most preferably contains 20 to 40 carbon atoms.

The fluorine atom is preferably present as a substituent group of a hydrocarbon side chain of a repeating unit of a denatured polyvinyl alcohol.

The denatured polyvinyl alcohol having a hydrocarbon group comprises hydrocarbon repeating units preferably in an amount of 2 to 80 mol %, and more preferably in an amount of 3 to 70 mol %. The repeating unit has a hydrocarbon group containing 10 to 100 carbon atoms.

A preferred denatured polyvinyl alcohol having a hydrocarbon group is represented by the formula (PVc):

—(VAl)$_x$—(HyC)$_y$—(VAc)$_z$—     (PVc)

in which VAl is a vinyl alcohol repeating unit; Hyc is a repeating unit having a hydrocarbon group containing 10 to 100 carbon atoms; VAc is a vinyl acetate repeating unit; x is 20 to 90 mol % (preferably 25 to 90 mol %); y is 2 to 80 mol % (preferably 3 to 70 mol %); and z is 0 to 30 mol % (preferably 2 to 20 mol %).

Preferred repeating units having a hydrocarbon group containing 10 to 100 carbon atoms (HyC) are represented by the formulas (HyC-I) and (HyC-II):

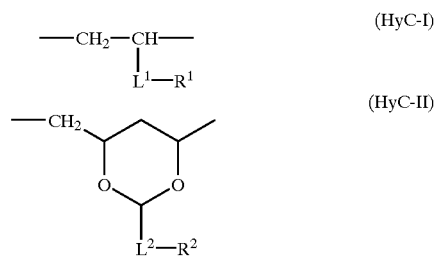

in which $L^1$ is a divalent linking group selected from the group consisting of —O—, —CO—, —SO$_2$—, —NH—, -alkylene-, -arylene- and a combination thereof; $L^2$ is a single bond or a divalent linking group selected from the group consisting of —O—, —CO—, —SO$_2$—, —NH—, -alkylene-, -arylene- and a combination thereof; and each of $R^1$ and $R^2$ is a hydrocarbon group containing 10 to 100 carbon atoms.

Examples of the divalent linking groups formed by the combinations are shown below.

L1: —O—CO—

L2: —O—CO-alkylene-O—

L3: —O—CO-alkylene-CO—NH—

L4: —O—CO-alkylene-NH—SO$_2$-arylene-O—

L5: -arylene-NH—CO—

L6: -arylene-CO—O—

L7: -arylene-CO—NH—

L8: -arylene-O—

L9: —O—CO—NH-arylene-NH—CO—

L10: —O—CO—O—

L11: —O—SO$_2$—

L12: —O—CO—NH-arylene-O—

L13: —O—CO—O-alkylene-CO—

L14: -alkylene-CO—O—

L15: —O—CO—NH-alkylene-NH—CO—O—

L16: —O—CO—NH-arylene-CO—(O-alkylene-)$_n$—O— (n: an integer of 1 to 10)

Examples of the repeating units having a hydrocarbon group containing 10 to 100 carbon atoms are shown below.

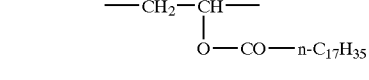  (HyC1)

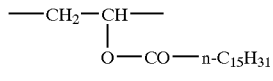  (HyC2)

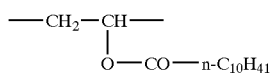  (HyC3)

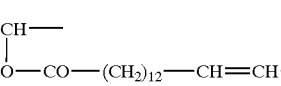  (HyC4)

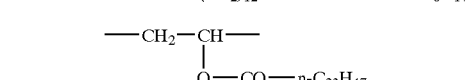  (HyC5)

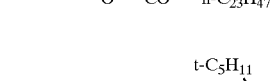  (HyC6)

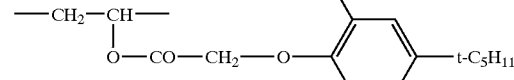  (HyC7)

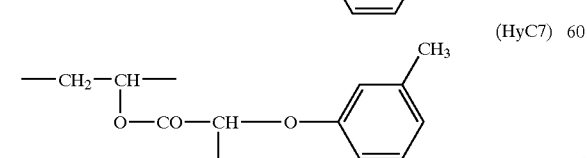

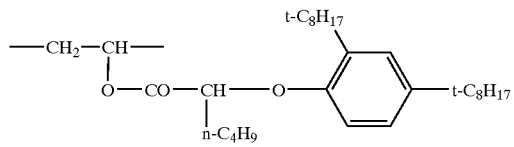  (HyC8)

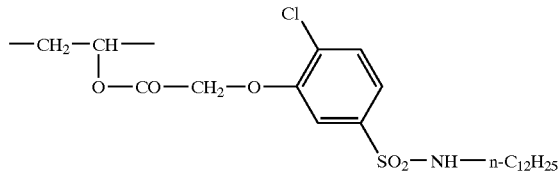  (HyC9)

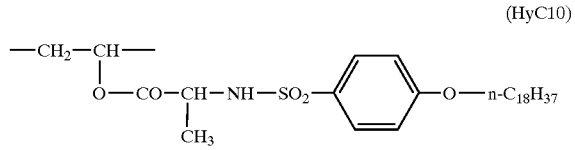  (HyC10)

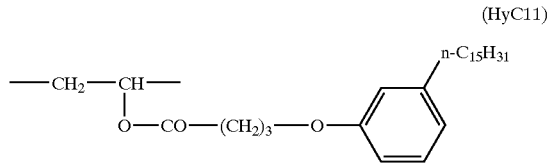  (HyC11)

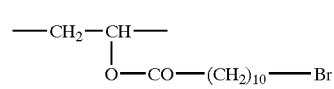  (HyC12)

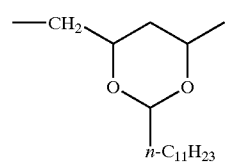  (HyC13)

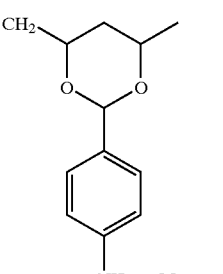  (HyC14)

(HyC15) 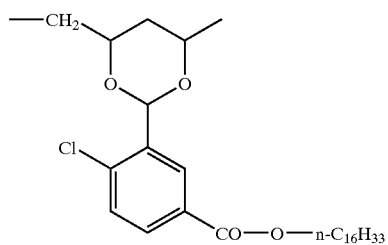
(HyC16) 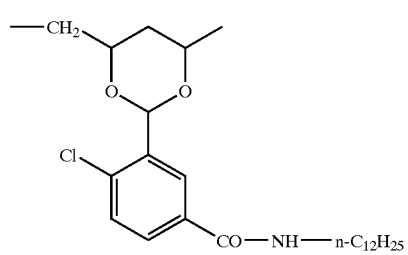
(HyC17) 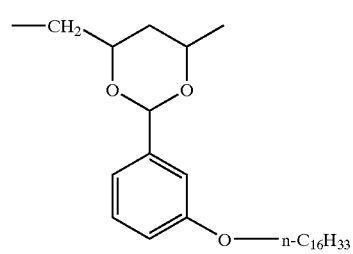
(HyC18) 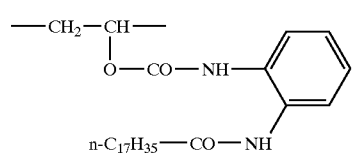
(HyC19) 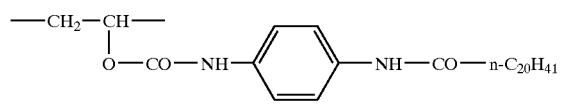
(HyC21) 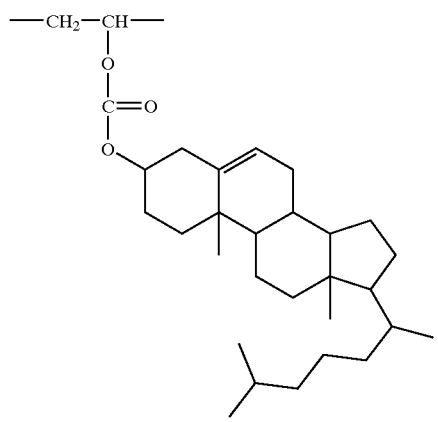
(HyC22) 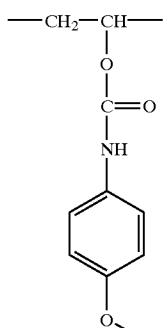
(HyC23) 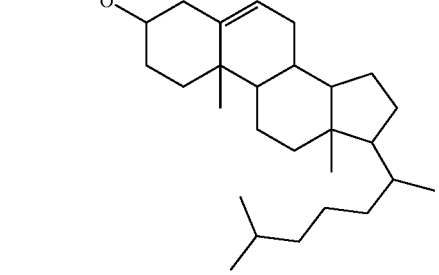
(HyC24) 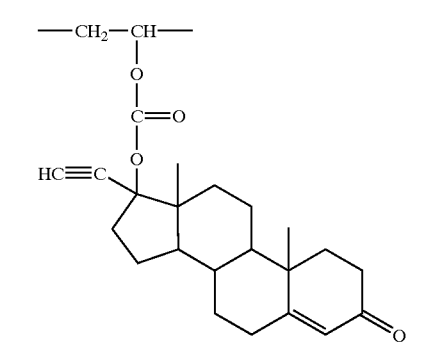

(HyC25)
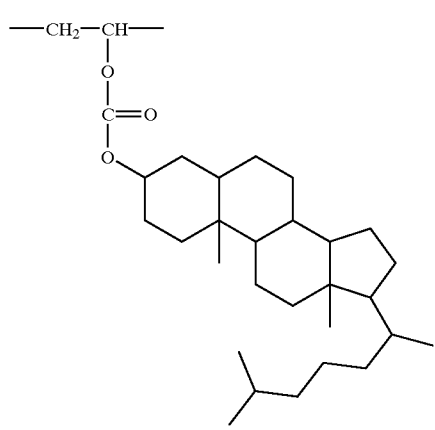
(HyC28)
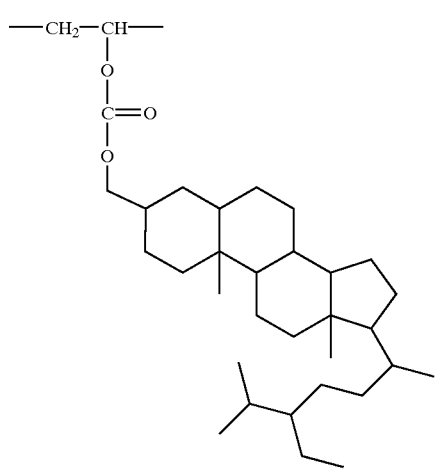
(HyC26)
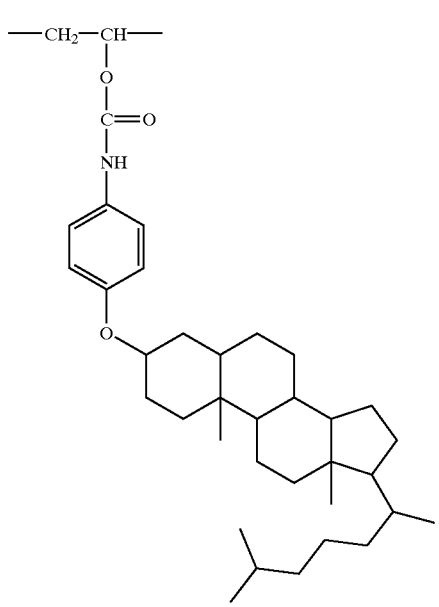
(HyC29)
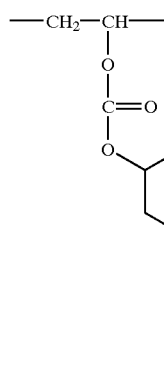
(HyC27)
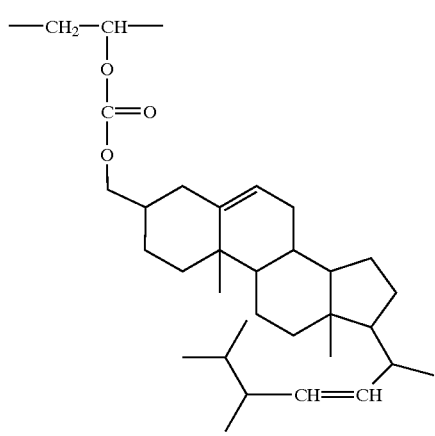
(HyC30)
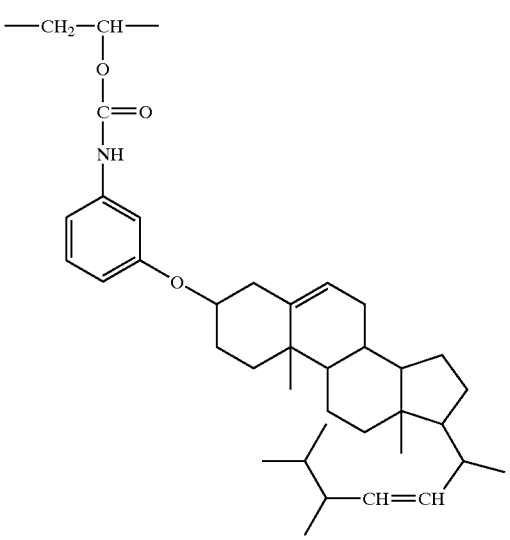

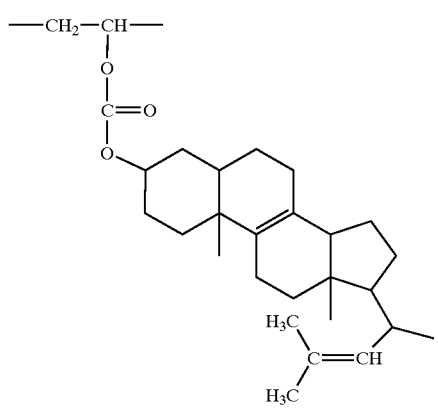 (HyC31)
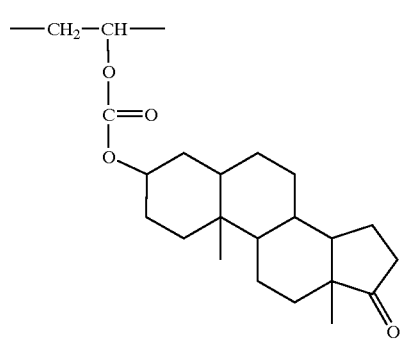 (HyC32)
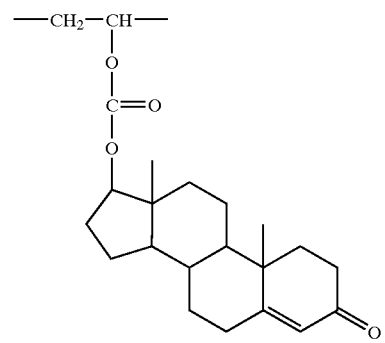 (HyC33)
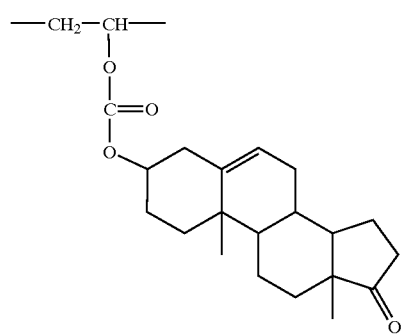 (HyC34)
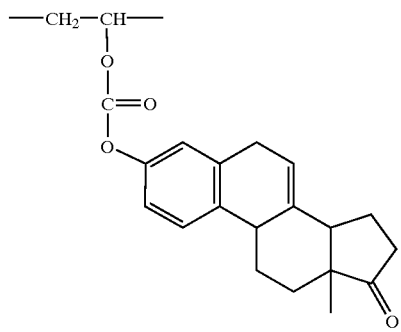 (HyC35)
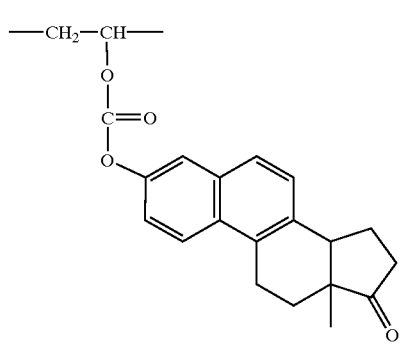 (HyC36)
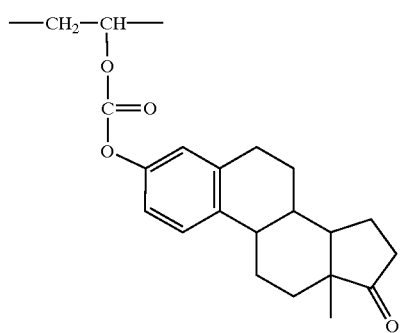 (HyC37)
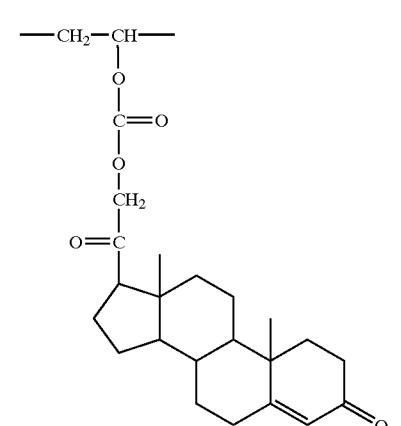 (HyC38)

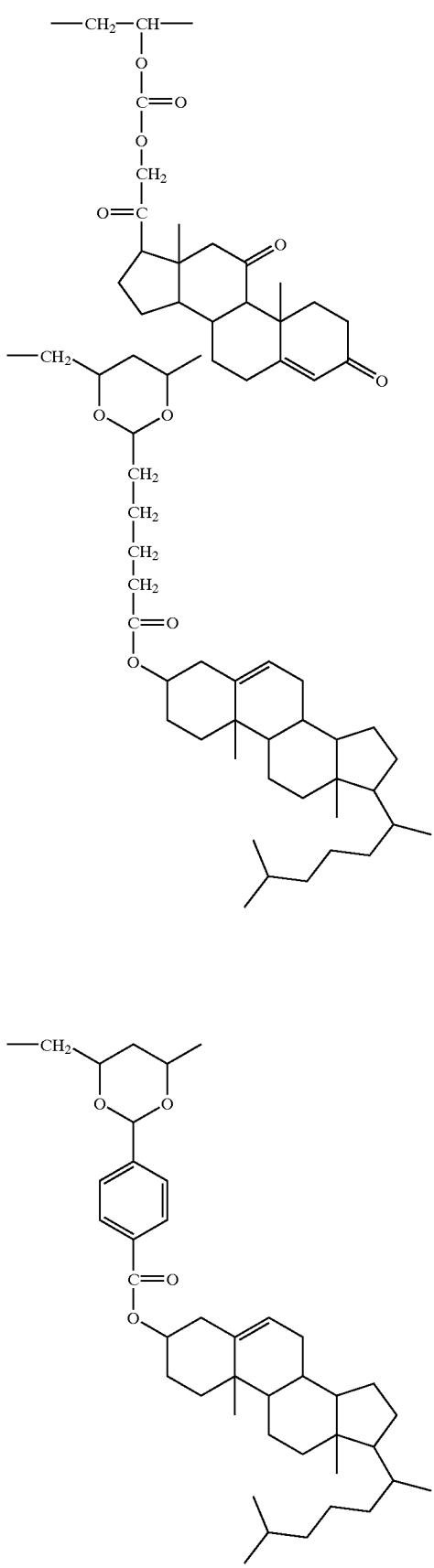
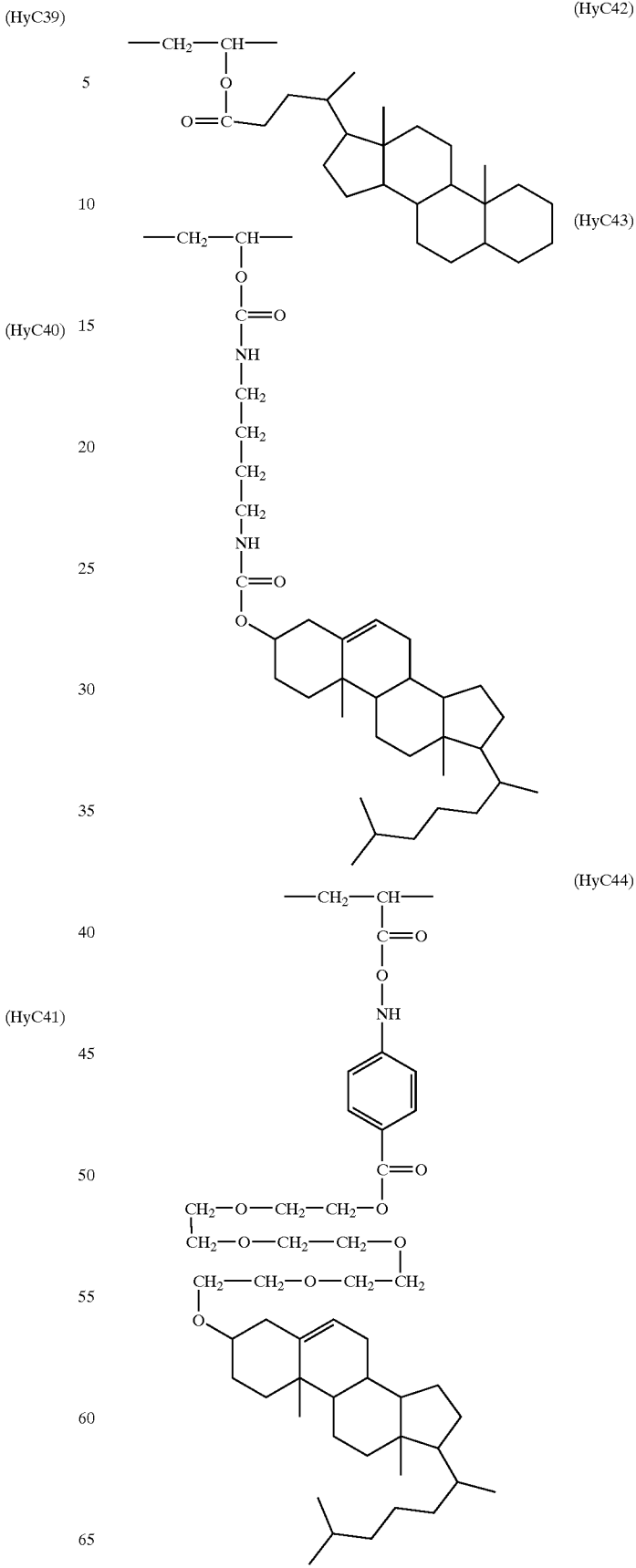

A specific group other than the hydrocarbon repeating units can be attached to the end of the denatured polyvinyl alcohol. Examples of the end groups include an alkylthio group.

Examples of the denatured polyvinyl alcohol having hydrocarbon groups containing 10 to 100 carbon atoms are shown below. The ratio of the repeating unit means mol %.

PV1: —(VAl)$_{80}$—(HyC1)$_8$—(VAc)$_{12}$—
PV2: —(VAl)$_{69}$—(HyC1)$_{19}$—(VAc)$_{12}$—
PV3: —(VAl)$_{68}$—(HyC2)$_{20}$—(VAc)$_{12}$—
PV4: —(VAl)$_{81}$—(HyC2)$_{17}$—(VAc)$_2$—
PV5: —(VAl)$_{68}$—(HyC3)$_{20}$—(VAc)$_{12}$—
PV6: —(VAl)$_{70}$—(HyC3)$_{15}$—(VAc)$_{18}$—
PV7: —(VAl)$_{74}$—(HyC4)$_{20}$—(VAc)$_6$—
PV8: —(VAl)$_{63}$—(HyC4)$_{25}$—(VAc)$_{12}$—
PV9: —(VAl)$_{70}$—(HYC4)$_{10}$—(VAc)$_{20}$—
PV10: —(VAl)$_{83}$—(HYC5)$_5$—(VAc)$_{12}$—
PV11: —(VAl)$_{85}$—(HyC5)$_3$—(VAc)$_{12}$—
PV12: —(VAl)$_{90}$—(HyC5)$_8$—(VAc)$_2$—
PV13: —(VAl)$_{78}$—(HyC6)$_{10}$—(VAc)$_{12}$—
PV14: —(VAl)$_{85}$—(HyC6)$_{13}$—(VAc)$_2$—
PV15: —(VAl)$_{67}$—(HyC6)$_{21}$—(VAc)$_{12}$—
PV16: —(VAl)$_{72}$—(HyC7)$_{16}$—(VAc)$_{12}$—
PV17: —(VAl)$_{81}$—(HyC7)$_{13}$—(VAc)$_6$—
PV18: —(VAl)$_{77}$—(HyC7)$_{21}$—(VAc)$_2$—
PV19: —(VAl)$_{70}$—(HyC8)$_{22}$—(VAc)$_8$—
PV20: —(VAl)$_{67}$—(HyC8)$_{11}$—(VAc)$_{12}$—
PV21: —(VAl)$_{70}$—(HYC8)$_{28}$—(VAc)$_2$—
PV22: —(VAl)$_{63}$—(HyC9)$_{35}$—(VAc)$_2$—
PV23: —(VAl)$_{68}$—(HyC9)$_{24}$—(VAc)$_8$—
PV24: —(VAl)$_{76}$—(HyC9)$_{12}$—(VAc)$_{12}$—
PV25: —(VAl)$_{76}$—(HyC10)$_{12}$—(VAc)$_{12}$—S-n-C$_{12}$H$_{25}$
PV26: —(VAl)$_{73}$—(HyC10)$_{15}$—(VAc)$_{12}$—S-n-C$_{12}$H$_{25}$
PV27: —(VAl)$_{81}$—(HyC10)$_7$—(VAc)$_{12}$—S-n-C$_{12}$H$_{25}$
PV28: —(VAl)$_{75}$—(HyC11)$_{19}$—(VAc)$_6$—
PV29: —(VAl)$_{75}$—(HyC11)$_{23}$—(VAc)$_2$—
PV30: —(VAl)$_{80}$—(HyC11)$_{18}$—(VAc)$_2$—
PV31: —(VAl)$_{68}$—(HyC12)$_{24}$—(VAc)$_8$—
PV32: —(VAl)$_{55}$—(HyC12)$_{33}$—(VAc)$_{12}$—
PV33: —(VAl)$_{68}$—(HyC12)$_{20}$—(VAc)$_{12}$—
PV34: —(VAl)$_{68}$—(HyC13)$_{20}$—(VAc)$_{12}$—
PV35: —(VAl)$_{73}$—(HyC13)$_{15}$—(VAc)$_{12}$—
PV36: —(VAl)$_{78}$—(HyC13)$_{10}$—(VAc)$_{12}$—
PV37: —(VAl)$_{53}$—(HyC14)$_{35}$—(VAc)$_{12}$—
PV38: —(VAl)$_{64}$—(HyC14)$_{30}$—(VAc)$_6$—
PV39: —(VAl)$_{73}$—(HyC14)$_{25}$—(VAc)$_2$—
PV40: —(VAl)$_{74}$—(HyC15)$_{14}$—(VAc)$_{12}$—
PV41: —(VAl)$_{38}$—(HyC15)$_{50}$—(VAc)$_{12}$—
PV42: —(VAl)$_{27}$—(HyC15)$_{65}$—(VAc)$_8$—
PV43: —(VAl)$_{72}$—(HyC16)$_{26}$—(VAc)$_2$—
PV44: —(VAl)$_{61}$—(HyC16)$_{31}$—(VAc)$_8$—
PV45: —(VAl)$_{72}$—(HyC16)$_{16}$—(VAc)$_{12}$—
PV46: —(VAl)$_{55}$—(HyC17)$_{33}$—(VAc)$_{12}$—
PV47: —(VAl)$_{32}$—(HyC17)$_{56}$—(VAc)$_{12}$—
PV48: —(VAl)$_{28}$—(HyC17)$_{70}$—(VAc)$_8$—
PV49: —(VAl)$_{63}$—(HyC18)$_{25}$—(VAc)$_{12}$—
PV50: —(VAl)$_{74}$—(HyC18)$_{20}$—(VAc)$_6$—
PV51: —(VAl)$_{83}$—(HyC18)$_{15}$—(VAc)$_2$—
PV52: —(VAl)$_{65}$—(HyC19)$_{31}$—(VAc)$_2$—S-n-C$_{12}$H$_{25}$
PV53: —(VAl)$_{51}$—(HyC19)$_{47}$—(VAc)$_2$—S-n-C$_{12}$H$_{25}$
PV54: —(VAl)$_{72}$—(HyC19)$_{20}$—(VAc)$_8$—S-n-C$_{12}$H$_{25}$
PV101: —(VAl)$_{80}$—(HyC21)$_8$—(VAc)$_{12}$—
PV102: —(VAl)$_{69}$—(HyC21)$_{19}$—(VAc)$_{12}$—
PV103: —(VAl)$_{68}$—(HyC22)$_{20}$—(VAc)$_{12}$—
PV104: —(VAl)$_{81}$—(HyC22)$_{17}$—(VAc)$_2$—
PV105: —(VAl)$_{68}$—(HyC23)$_{20}$—(VAc)$_{12}$—
PV106: —(VAl)$_{70}$—(HyC23)$_{15}$—(VAc)$_{18}$—
PV107: —(VAl)$_{74}$—(HyC24)$_{20}$—(VAc)$_6$—
PV108: —(VAl)$_{63}$—(HyC24)$_{25}$—(VAc)$_{12}$—
PV109: —(VAl)$_{70}$—(HyC24)$_{10}$—(VAc)$_{20}$—
PV110: —(VAl)$_{83}$—(HyC25)$_5$—(VAc)$_{12}$—
PV111: —(VAl)$_{85}$—(HyC25)$_3$—(VAc)$_{12}$—
PV112: —(VAl)$_{90}$—(HyC25)$_8$—(VAc)$_2$—
PV113: —(VAl)$_{78}$—(HyC26)$_{10}$—(VAc)$_{12}$—
PV114: —(VAl)$_{85}$—(HyC26)$_{13}$—(VAc)$_2$—
PV115: —(VAl)$_{67}$—(HyC26)$_{21}$—(VAc)$_{12}$—
PV116: —(VAl)$_{72}$—(HyC27)$_{16}$—(VAc)$_{12}$—
PV117: —(VAl)$_{81}$—(HyC27)$_{13}$—(VAc)$_6$—
PV118: —(VAl)$_{77}$—(HyC27)$_{21}$—(VAc)$_2$—
PV119: —(VAl)$_{70}$—(HyC28)$_{22}$—(VAc)$_8$—
PV120: —(VAl)$_{67}$—(HyC28)$_{11}$—(VAc)$_{12}$—
PV121: —(VAl)$_{70}$—(HyC28)$_{28}$—(VAc)$_2$—
PV122: —(VAl)$_{63}$—(HyC29)$_{35}$—(VAc)$_2$—
PV123: —(VAl)$_{68}$—(HyC29)$_{24}$—(VAc)$_8$—
PV124: —(VAl)$_{76}$—(HyC29)$_{12}$—(VAc)$_{12}$—
PV125: —(VAl)$_{76}$—(HyC30)$_{12}$—(VAc)$_{12}$—S-n-C$_{12}$H$_{25}$
PV126: —(VAl)$_{73}$—(HyC30)$_{15}$—(VAc)$_{12}$—S-n-C$_{12}$H$_{25}$
PV127: —(VAl)$_{81}$—(HyC30)$_7$—(VAc)$_{12}$—S-n-C$_{12}$H$_{25}$
PV128: —(VAl)$_{75}$—(HyC31)$_{19}$—(VAc)$_6$—
PV129: —(VAl)$_{75}$—(HyC31)$_{23}$—(VAc)$_2$—
PV130: —(VAl)$_{80}$—(HyC31)$_{18}$—(VAc)$_2$—
PV131: —(VAl)$_{68}$—(HyC32)$_{24}$—(VAc)$_8$—
PV132: —(VAl)$_{55}$—(HyC32)$_{33}$—(VAc)$_{12}$—
PV133: —(VAl)$_{68}$—(HyC32)$_{20}$—(VAc)$_{12}$—
PV134: —(VAl)$_{68}$—(HyC33)$_{20}$—(VAc)$_{12}$—
PV135: —(VAl)$_{73}$—(HyC33)$_{15}$—(VAc)$_{12}$—
PV136: —(VAl)$_{78}$—(HyC33)$_{10}$—(VAc)$_{12}$—
PV137: —(VAl)$_{53}$—(HyC34)$_{35}$—(VAc)$_{12}$—
PV138: —(VAl)$_{64}$—(HyC34)$_{30}$—(VAc)$_6$—
PV139: —(VAl)$_{73}$—(HyC34)$_{25}$—(VAc)$_2$—
PV140: —(VAl)$_{74}$—(HyC35)$_{14}$—(VAc)$_{12}$—
PV141: —(VAl)$_{38}$—(HyC35)$_{50}$—(VAc)$_{12}$—
PV142: —(VAl)$_{27}$—(HyC35)$_{65}$—(VAc)$_8$—
PV143: —(VAl)$_{72}$—(HyC36)$_{26}$—(VAc)$_2$—
PV144: —(VAl)$_{61}$—(HyC36)$_{31}$—(VAc)$_8$—
PV145: —(VAl)$_{72}$—(HyC36)$_{16}$—(VAc)$_{12}$—
PV146: —(VAl)$_{55}$—(HyC37)$_{33}$—(VAc)$_{12}$—
PV147: —(VAl)$_{32}$—(HyC37)$_{56}$—(VAc)$_{12}$—
PV148: —(VAl)$_{28}$—(HyC37)$_{70}$—(VAc)$_8$—
PV149: —(VAl)$_{63}$—(HyC38)$_{25}$—(VAc)$_{12}$—
PV150: —(VAl)$_{74}$—(HyC38)$_{20}$—(VAc)$_6$—
PV151: —(VAl)$_{83}$—(HyC38)$_{15}$—(VAc)$_2$—
PV152: —(VAl)$_{65}$—(HyC39)$_{31}$—(VAc)$_2$—S-n-C$_{12}$H$_{25}$

PV153: —(VAl)₅₁—(HyC39)₄₇—(VAc)₂—S-n-C₁₂H₂₅
PV154: —(VAl)₇₂—(HyC39)₂₀—(VAc)₈—S-n-C₁₂H₂₅

The denatured polyvinyl alcohol containing fluorine atoms comprises repeating units containing fluorine atoms preferably in an amount of 0.05 to 80 mol %, and more preferably in an amount of 0.5 to 70 mol %.

A preferred denatured polyvinyl alcohol containing fluorine atoms is represented by the formula (PVf):

  (PVf)

in which VAl is a vinyl alcohol repeating unit; FRU is a repeating unit containing fluorine atoms; VAc is a vinyl acetate repeating unit; x is 20 to 99 mol % (preferably 24 to 98 mol %); y is 0.05 to 80 mol % (preferably 0.5 to 70 mol %); and z is 0 to 30 mol % (preferably 2 to 20 mol %).

Preferred repeating units containing fluorine atoms (FRU) are represented by the formulas (FRU-I) and (FRU-II):

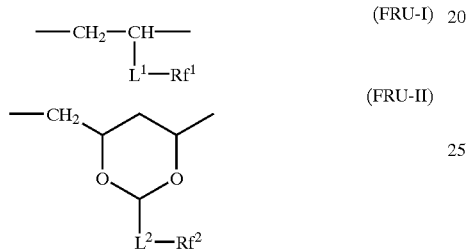

in which $L^1$ is a divalent linking group selected from the group consisting of —O—, —CO—, —SO₂—, —NH—, -alkylene-, -arylene- and a combination thereof; $L^2$ is a single bond or a divalent linking group selected from the group consisting of —O—, —CO—, —SO₂—, —NH—, -alkylene-, -arylene- and a combination thereof; and each of $Rf^1$ and $Rf^2$ is a hydrocarbon group substituted with fluorine atom.

The alkylene group and the arylene group can be substituted with fluorine atom.

Examples of the divalent linking groups formed by the combinations are the same as the examples described in the formulas (HyC-I) and (HyC-II).

The hydrocarbon moiety contained in the hydrocarbon group substituted with fluorine atom is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom (other than fluorine atom). The hydrocarbon group contains 1 to 100 carbon atoms, preferably 2 to 60 carbon atoms, and more preferably 3 to 40 carbon atoms. The substitution ratio of hydrogen atoms in the hydrocarbon group substituted with fluorine atoms is preferably in the range of 50 to 100 mol %, more preferably in the range of 70 to 100 mol %, further preferably in the range of 80 to 100 mol %, and most preferably in the range of 90 to 100 mol %.

Examples of the repeating units containing fluorine atoms are shown below.

 (FRU1)

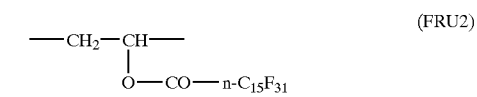 (FRU2)

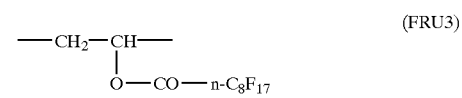 (FRU3)

 (FRU4)

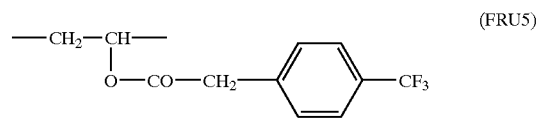 (FRU5)

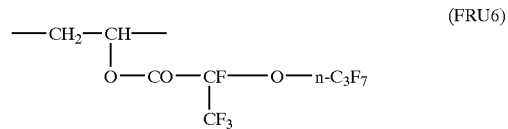 (FRU6)

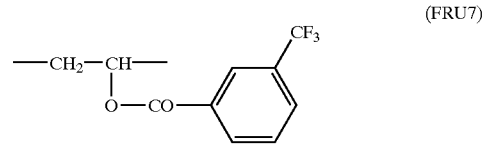 (FRU7)

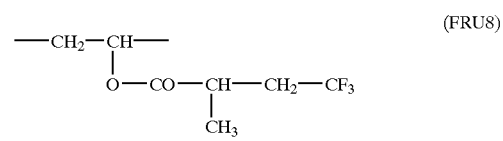 (FRU8)

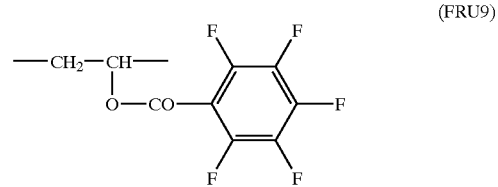 (FRU9)

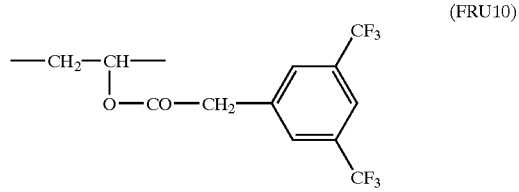 (FRU10)

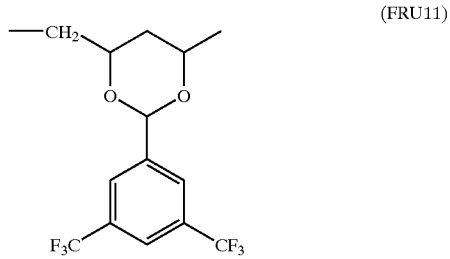 (FRU11)

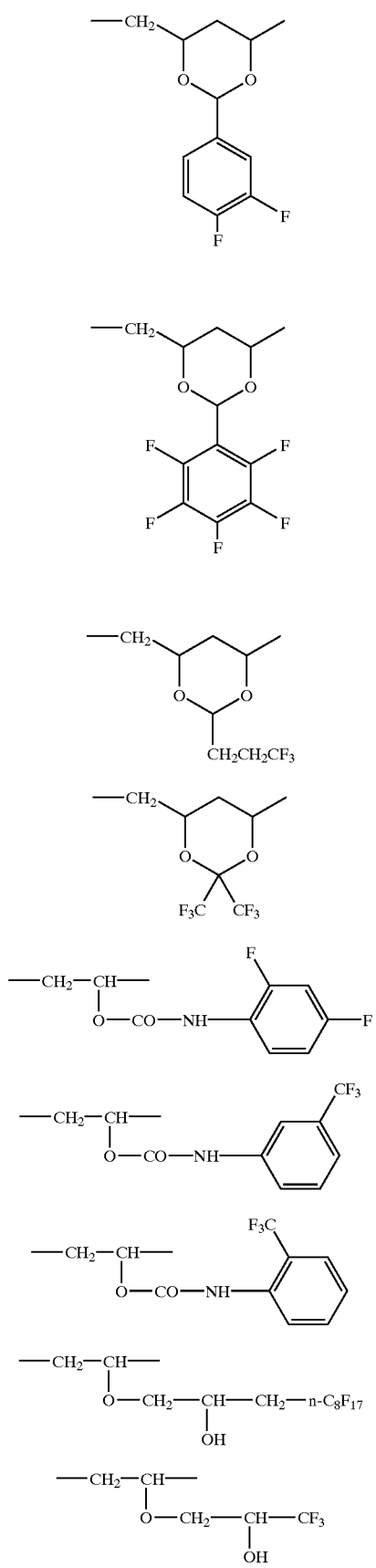

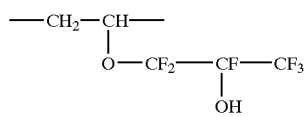

A specific group other than the repeating units containing fluorine atoms can be attached to the end of the denatured polyvinyl alcohol. Examples of the end groups include an alkylthio group.

Examples of the denatured polyvinyl alcohol containing fluorine atoms are shown below. The ratio of the repeating unit means mol %.

PV201: —(VAl)$_{80}$—(FRU1)$_8$—(VAc)$_{12}$—
PV202: —(VAl)$_{69}$—(FRU1)$_{19}$—(VAc)$_{12}$—
PV203: —(VAl)$_{70}$—(FRU1)$_{10}$—(VAc)$_{20}$—
PV204: —(VAl)$_{74}$—(FRU2)$_{20}$—(VAc)$_6$—
PV205: —(VAl)$_{65}$—(FRU2)$_{27}$—(VAc)$_{12}$—
PV206: —(VAl)$_{70}$—(FRU2)$_{10}$—(VAc)$_{20}$—
PV207: —(VAl)$_{78}$—(FRU3)$_{10}$—(VAc)$_{12}$—S-n-C$_{12}$H$_{25}$
PV208: —(VAl)$_{85}$—(FRU3)$_{13}$—(VAc)$_2$—S-n-C$_{12}$H$_{25}$
PV209: —(VAl)$_{67}$—(FRU3)$_{21}$—(VAc)$_{12}$—S-n-C$_{12}$H$_{25}$
PV210: —(VAl)$_{58}$—(FRU4)$_{40}$—(VAc)$_2$—
PV211: —(VAl)$_{40}$—(FRU4)$_{54}$—(VAc)$_6$—
PV212: —(VAl)$_{24}$—(FRU4)$_{64}$—(VAc)$_{12}$—
PV213: —(VAl)$_{50}$—(FRU5)$_{38}$—(VAc)$_{12}$—
PV214: —(VAl)$_{53}$—(FRU5)$_{45}$—(VAc)$_2$—
PV215: —(VAl)$_{31}$—(FRU5)$_{61}$—(VAc)$_8$—
PV216: —(VAl)$_{80}$—(FRU6)$_8$—(VAc)$_{12}$—
PV217: —(VAl)$_{76}$—(FRU6)$_{12}$—(VAc)$_{12}$—
PV218: —(VAl)$_{81}$—(FRU6)$_{15}$—(VAc)$_4$—
PV219: —(VAl)$_{55}$—(FRU7)$_{44}$—(VAc)$_1$—
PV220: —(VAl)$_{42}$—(FRU7)$_{56}$—(VAc)$_2$—
PV221: —(VAl)$_{27}$—(FRU7)$_{61}$—(VAc)$_{12}$—
PV222: —(VAl)$_{40}$—(FRU8)$_{48}$—(VAc)$_{12}$—
PV223: —(VAl)$_{33}$—(FRU8)$_{59}$—(VAc)$_8$—
PV224: —(VAl)$_{28}$—(FRU8)$_{70}$—(VAc)$_2$—
PV225: —(VAl)$_{68}$—(FRU9)$_{20}$—(VAc)$_{12}$—
PV226: —(VAl)$_{65}$—(FRU9)$_{15}$—(VAc)$_{20}$—
PV227: —(VAl)$_{64}$—(FRU9)$_{28}$—(VAc)$_8$—
PV228: —(VAl)$_{78}$—(FRU10)$_{21}$—(VAc)$_1$—S-n-C$_{12}$H$_{25}$
PV229: —(VAl)$_{66}$—(FRU10)$_{30}$—(VAc)$_4$—S-n-C$_{12}$H$_{25}$
PV230: —(VAl)$_{53}$—(FRU10)$_{35}$—(VAc)$_{12}$—S-n-C$_{12}$H$_{25}$
PV231: —(VAl)$_{63}$—(FRU11)$_{25}$—(VAc)$_{12}$—
PV232: —(VAl)$_{80}$—(FRU11)$_{18}$—(VAc)$_2$—
PV233: —(VAl)$_{46}$—(FRU11)$_{34}$—(VAc)$_{20}$—
PV234: —(VAl)$_{60}$—(FRU12)$_{28}$—(VAc)$_{12}$—
PV235: —(VAl)$_{53}$—(FRU12)$_{35}$—(VAc)$_{12}$—
PV236: —(VAl)$_{52}$—(FRU12)$_{40}$—(VAc)$_8$—
PV237: —(VAl)$_{88}$—(FRU13)$_{10}$—(VAc)$_2$—
PV238: —(VAl)$_{67}$—(FRU13)$_{21}$—(VAc)$_{12}$—
PV239: —(VAl)$_{62}$—(FRU13)$_{30}$—(VAc)$_8$—
PV240: —(VAl)$_{81}$—(FRU14)$_{18}$—(VAc)$_1$—
PV241: —(VAl)$_{73}$—(FRU14)$_{25}$—(VAc)$_2$—
PV242: —(VAl)$_{58}$—(FRU14)$_{30}$—(VAc)$_{12}$—
PV243: —(VAl)$_{74}$—(FRU15)$_{25}$—(VAc)$_1$—
PV244: —(VAl)$_{68}$—(FRU15)$_{30}$—(VAc)$_2$—

PV245: —(VAl)$_{52}$—(FRU15)$_{40}$—(VAc)$_8$—
PV246: —(VAl)$_{63}$—(FRU16)$_{35}$—(VAc)$_2$—
PV247: —(VAl)$_{55}$—(FRU16)$_{41}$—(VAc)$_4$—
PV248: —(VAl)$_{33}$—(FRU16)$_{55}$—(VAc)$_{12}$—
PV249: —(VAl)$_{53}$—(FRU17)$_{35}$—(VAc)$_{12}$—S-n-C$_{12}$H$_{25}$
PV250: —(VAl)$_{40}$—(FRU17)$_{40}$—(VAc)$_{20}$—S-n-C$_{12}$H$_{25}$
PV251: —(VAl)$_{48}$—(FRU17)$_{48}$—(VAc)$_4$—S-n-C$_{12}$H$_{25}$
PV252: —(VAl)$_{74}$—(FRU18)$_{25}$—(VAc)$_1$—
PV253: —(VAl)$_{61}$—(FRU18)$_{31}$—(VAc)$_8$—
PV254: —(VAl)$_{48}$—(FRU18)$_{40}$—(VAc)$_{12}$—
PV255: —(VAl)$_{86}$—(FRU19)$_{12}$—(VAc)$_2$—
PV256: —(VAl)$_{78}$—(FRU19)$_{18}$—(VAc)$_4$—
PV257: —(VAl)$_{68}$—(FRU19)$_{24}$—(VAc)$_8$—
PV258: —(VAl)$_{76}$—(FRU20)$_{22}$—(VAc)$_2$—
PV259: —(VAl)$_{58}$—(FRU20)$_{30}$—(VAc)$_{12}$—
PV260: —(VAl)$_{50}$—(FRU20)$_{35}$—(VAc)$_{15}$—
PV261: —(VAl)$_{78}$—(FRU21)$_{10}$—(VAc)$_{12}$—
PV262: —(VAl)$_{70}$—(FRU21)$_{18}$—(VAc)$_{12}$—
PV263: —(VAl)$_{57}$—(FRU21)$_{31}$—(VAc)$_{12}$—

The denatured polyvinyl alcohol can have a polymerizable group. A polymer having a polymerizable group is used in combination with a discotic liquid crystal molecule having a polymerizable group to chemically bind the polymer and the discotic liquid crystal molecule along an interface between a liquid crystal layer (such as an optical anisotropic layer) and an orientation layer. The mechanical strength of a liquid crystal element (such as an optical compensatory sheet) can be improved by the chemical bond.

The polymerizable group of the denatured polyvinyl alcohol is determined depending the polymerizable group (Q) of the liquid crystal molecule (described below). The polymerizable group (Q) of the liquid crystal molecule preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6). The polymerizable group of the denatured polyvinyl alcohol is also preferably is an unsaturated polymerizable group, an aziridinyl group or an epoxy group, more preferably is an unsaturated polymerizable group, and most preferably is an ethylenically unsaturated group.

The polymerizable group is preferably not directly attached to the main chain of the denatured polyvinyl alcohol. In other words, a linking group preferably intervenes between the main chain and the polymerizable group. Examples of the linking groups include —O—, —O—CO—, —O—CO—NH—, —O—CO—NH-alkylene-, —O—CO—NH-alkylene-O—, —O—CO—NH-alkylene-CO—O—, —O—CO—NH-alkylene-O—CO—, —O—CO—NH-alkylene-CO—NH—, —O—CO-alkylene-O—CO—, —O—CO-arylene-O-alkylene-O—CO—, —O—CO-arylene-O-alkylene-O—, —O—CO-arylene-O-alkylene- and —O-alkylene-O—CO—, in which the left side is attached to the main chain, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group. Examples of the substituent groups include a halogen atom (F, Cl, Br), carboxyl, cyano, nitro, carbamoyl, sulfamoyl, an alkyl group, a cycloalkyl group, an alkoxy group, an alkylthio group, an acyl group, an acyloxy group, an alkylcarbamoyl group, an alkylsulfamoyl group, an amido group, a sulfonamido group and an alkylsulfonyl group.

The alkyl group can have a branched structure. The alkyl group preferably contains 1 to 20 carbon atoms, more preferably contains 1 to 15 carbon atoms, further preferably contains 1 to 10 carbon atoms, and most preferably contains 1 to 6 carbon atoms.

The cycloalkyl group preferably is cyclohexyl.

The alkoxy group can have a branched structure. The alkoxy group preferably contains 1 to 20 carbon atoms, more preferably contains 1 to 15 carbon atoms, further preferably contains 1 to 10 carbon atoms, and most preferably contains 1 to 6 carbon atoms.

The alkylthio group can have a branched structure. The alkylthio group preferably contains 1 to 20 carbon atoms, more preferably contains 1 to 15 carbon atoms, further preferably contains 1 to 10 carbon atoms, and most preferably contains 1 to 6 carbon atoms.

The acyl group preferably contains 2 to 20 carbon atoms, more preferably contains 2 to 15 carbon atoms, further preferably contains 2 to 10 carbon atoms, and most preferably contains 2 to 6 carbon atoms.

The acyloxy group preferably contains 2 to 20 carbon atoms, more preferably contains 2 to 15 carbon atoms, further preferably contains 2 to 10 carbon atoms, and most preferably contains 2 to 6 carbon atoms.

The alkylcarbamoyl group preferably contains 2 to 20 carbon atoms, more preferably contains 2 to 15 carbon atoms, further preferably contains 2 to 10 carbon atoms, and most preferably contains 2 to 6 carbon atoms. The alkyl moiety of the alkylcarbamoyl group can further have a substituent group (e.g., an alkoxy group).

The alkylsulfamoyl group preferably contains 1 to 20 carbon atoms, more preferably contains 1 to 15 carbon atoms, further preferably contains 1 to 10 carbon atoms, and most preferably contains 1 to 6 carbon atoms. The alkyl moiety of the alkylsulfamoyl group can further have a substituent group (e.g., an alkoxy group).

The amido group preferably contains 2 to 20 carbon atoms, more preferably contains 2 to 15 carbon atoms, further preferably contains 2 to 10 carbon atoms, and most preferably contains 2 to 6 carbon atoms.

The sulfonamido group preferably contains 1 to 20 carbon atoms, more preferably contains 1 to 15 carbon atoms, further preferably contains 1 to 10 carbon atoms, and most preferably contains 1 to 6 carbon atoms.

The alkylsulfonyl group preferably contains 1 to 20 carbon atoms, more preferably contains 1 to 15 carbon atoms, further preferably contains 1 to 10 carbon atoms, and most preferably contains 1 to 6 carbon atoms. The alkyl moiety of the alkylsulfonyl group can further have a substituent group (e.g., an alkoxy group).

The denatured polyvinyl alcohol can have two or more polymerizable groups.

A repeating unit having the polymerizable group is preferably represented by the formula (II).

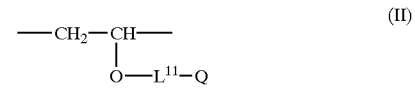

In the formula (II), L$^{11}$ is a single bond or a divalent linking group selected from the group consisting of —CO—, —CO—NH—, —CO—NH-alkylene-, —CO—NH-alkylene-O—, —CO—NH-alkylene-CO—O—, —CO—NH-alkylene-O—CO—, —CO—NH-alkylene-CO—NH—, —CO-alkylene-O—CO—, —CO-arylene-O-alkylene-O—CO—, —CO-arylene-O-alkylene-O—, —CO-arylene-O-alkylene- and -alkylene-O—CO—. $L^{11}$ preferably is —CO—NH-alkylene-, —CO—NH-alkylene-O—, —CO—NH-alkylene-O—CO—, —CO-arylene-O-alkylene-O—CO—, —CO-arylene-O-alkylene-O—, —CO-arylene-O-alkylene- or -alkylene-O—CO—, and particularly preferably is —CO—NH-alkylene-O—CO—.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group. Examples of the substituent groups are the same as the above-described substituent groups.

In the formula (II), Q is a polymerizable group. The polymerizable group of the denatured polyvinyl alcohol is analogous to the polymerizable group (Q) of the liquid crystal molecule, as is described above.

Examples of the repeating units having a polymerizable group are shown below.

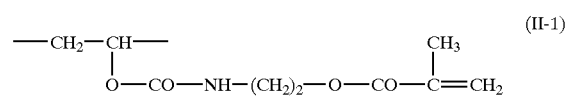 (II-1)

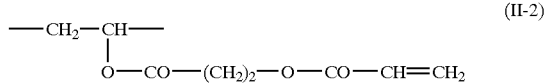 (II-2)

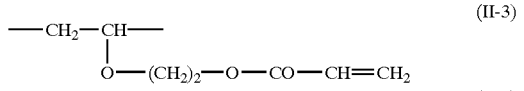 (II-3)

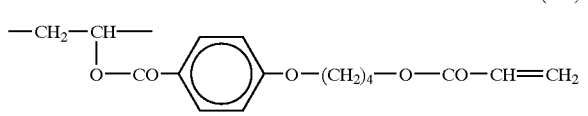 (II-4)

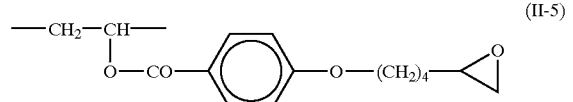 (II-5)

 (II-6)

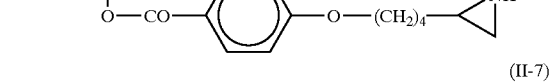 (II-7)

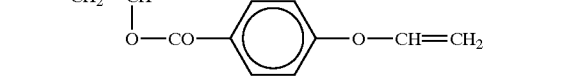 (II-8)

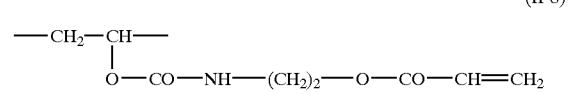 (II-9)

-continued

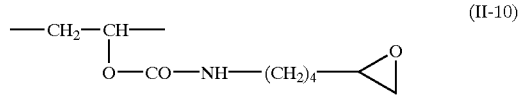 (II-10)

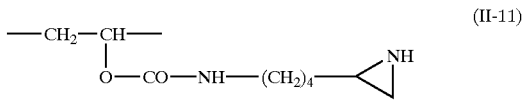 (II-11)

The polymerizable group can be introduced into the repeating unit group having a hydrocarbon group containing 10 to 100 carbon atoms or the repeating unit containing fluorine atoms. The polymerizable group preferably is a substituent group of a hydrocarbon group or a hydrocarbon group substituted with fluorine atom, and more preferably is a substituent group of the hydrocarbon group (or the hydrocarbon group substituted with fluorine atom) positioned at the end of the side chain.

The polymerizable group is preferably not directly attached to the hydrocarbon group (or the hydrocarbon group substituted with fluorine atom). In other words, a linking group preferably intervenes between the hydrocarbon group and the polymerizable group. Examples of the linking groups include —O—, —CO—, —O—CO—, —CO—O—, —O—CO—O—, —CO—NH, —SO₂—NH—, —NH—CO—, —NH—CO—O—, —NH—SO₂—, -alkylene-, -alkenylene-, -alkynylene-, —O-alkylene- and -alkylene-O—, in which the left side is attached to the hydrocarbon group, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The alkynylene group can have a branched or cyclic structure. The alkynylene group contains preferably 2 to 30 carbon atoms, more preferably 2 to 20 carbon atoms, further preferably 2 to 15 carbon atoms, and most preferably 2 to 12 carbon atoms.

The hydrocarbon group (or the hydrocarbon group substituted with fluorine atom) can have two or more polymerizable groups.

A repeating unit having the polymerizable group and the hydrocarbon group is preferably represented by the formula (III).

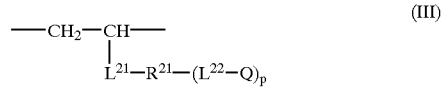 (III)

In the formula (III), $L^{21}$ is a divalent linking group selected from the group consisting of —O—, —CO—, —SO₂—, —NH—, -alkylene-, -arylene- and a combination thereof. $L^{21}$ is the same as $L^1$ in the formula (HyC-I) or (FRU-I).

In the formula (III), $R^{21}$ is a hydrocarbon group containing 10 to 100 carbon atoms or a hydrocarbon group substituted with fluorine atom. The hydrocarbon group containing 10 to 100 carbon atoms is the same as $R^1$ in the formula (HyC-I). The hydrocarbon group containing fluorine atom is the same as $Rf^1$ in the formula (FRU-I).

In the formula (III), $L^{22}$ is a single bond or a divalent linking group selected from the group consisting of —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene-, —O-alkylene- and -alkylene-O—.

The alkylene group, the alkenylene group and the alkylene group are the same as those described above.

In the formula (III), Q is a polymerizable group. The polymerizable group of the denatured polyvinyl alcohol is analogous to the polymerizable group (Q) of the liquid crystal molecule, as is described above.

In the formula (III), p is 1, 2 or 3, preferably is 1 or 2, and more preferably is 1.

In the case that a repeating unit having a polymerizable group is introduced into a denatured polyvinyl alcohol, the polyvinyl alcohol preferably contains the polymerizable repeating units in an amount of 0.1 to 10 mol %, and more preferably in an amount of 3 to 50 mol %.

In the case that a repeating unit having a hydrocarbon group (or a hydrocarbon group substituted with fluorine atom) and a polymerizable group is introduced into a denatured polyvinyl alcohol, the polyvinyl alcohol preferably contains the polymerizable hydrocarbon repeating units in an amount of 2 to 80 mol %, and more preferably in an amount of 3 to 50 mol %.

A denatured polyvinyl alcohol having (1) a repeating unit having a hydrocarbon group (or a hydrocarbon group substituted with fluorine atom), and (2) a repeating unit having a polymerizable group is preferably represented by the formula (PVII):

$$—(VAl)_x—(I)_a—(II)_b—(VAc)_y— \quad \quad (PVII)$$

in which VAl is a vinyl alcohol repeating unit; I is a repeating unit having a hydrocarbon group containing 10 to 100 carbon atoms or a repeating unit having a hydrocarbon group substituted with fluorine atom; II is a repeating unit having a polymerizable group; VAc is a vinyl acetate repeating unit; x is 20 to 95 mol % (preferably 30 to 95 mol %); a is 2 to 80 mol % (preferably 3 to 50 mol %); b is 0.1 to 10 mol % (preferably 0.2 to 5 mol %); and y is 0 to 30 mol % (preferably 1 to 20 mol %).

A denatured polyvinyl alcohol having (3) a repeating unit having a hydrocarbon group (or a hydrocarbon group substituted with fluorine atom) and a polymerizable group is preferably represented by the formula (PVIII):

$$—(VAl)_x—(III)_c—(VAc)_y— \quad \quad (PVIII)$$

in which VAl is a vinyl alcohol repeating unit; III is a repeating unit having a polymerizable group and a hydrocarbon group containing 10 to 100 carbon atoms or a repeating unit having a polymerizable group and a hydrocarbon group substituted with fluorine atom; VAc is a vinyl acetate repeating unit; x is 20 to 95 mol % (preferably 30 to 95 mol %); c is 2 to 80 mol % (preferably 3 to 50 mol %); and y is 0 to 30 mol % (preferably 1 to 20 mol %).

A denatured polyvinyl alcohol can have a combination of the above-described repeating units. Accordingly, the present invention can use a denatured polyvinyl alcohol having the repeating units (1) and (3), a denatured polyvinyl alcohol having the repeating units (2) and (3), or a denatured polyvinyl alcohol having the repeating units (1), (2) and (3).

A hydrophilic group can be introduced into the denatured polyvinyl alcohol. In the case that a denatured polyvinyl alcohol has a hydrophilic group, an orientation layer can be formed by using an aqueous medium. Even if polyvinyl alcohol is denatured to some extent, the polyvinyl alcohol has many hydroxyl groups, which are rather strong hydrophilic groups. Therefore, it has been considered that a denatured polyvinyl can be dissolved in an aqueous medium. However, the applicants surprisingly note that the above-described denatured polyvinyl alcohol is sometimes not dissolved in an aqueous medium. The hydrophilic group is preferably introduced into the denatured polyvinyl alcohol in the case that the denatured polyvinyl alcohol is not dissolved in an aqueous medium.

The hydrophilic group has a hydrophilic characteristic stronger than that of hydroxyl of polyvinyl alcohol. A repeating unit having the strongly hydrophilic group is preferably introduced into a denatured polyvinyl alcohol. A solubility of a denatured polyvinyl alcohol having the strongly hydrophilic repeating units in water is preferably larger than a solubility of a denatured polyvinyl alcohol having hydroxyl in place of the strongly hydrophilic repeating units.

Examples of the hydrophilic groups include an anionic hydrophilic group, a cationic hydrophilic group and a nonionic hydrophilic group. Examples of the cationic groups include carboxyl and sulfo. An alcoholate and a phenolate can also be used as the anionic group. Examples of the cationic group include ammonium groups. Amino, an amido group, a sulfonamido group, hydrazino, hydrazido, carbamoyl and sulfamoyl can also be used as the anionic group. The anionic group or the cationic group is preferably in the form of a salt. The counter ion of the anionic group preferably is an alkali metal ion or an ammonium ion. The counter ion of the cationic group preferably is a halide ion. Examples of the nonionic group (having a hydrophilic characteristic stronger than that of hydroxyl) include a group comprising polyethylene glycol units.

Examples of the hydrophilic groups are shown below.

—SO$_3$H (Hy1)

—SO$_3$K (Hy2)

—SO$_3$Na (Hy3)

—COOH (Hy4)

—COOK (Hy5)

—COONa (Hy6)

—OK (Hy7)

—ONa (Hy8)

—SO$_3$NH$_4$ (Hy9)

—SO$_3$N(CH$_3$)$_4$ (Hy10)

—COONH$_4$ (Hy11)

—COON(CH$_3$)$_4$ (Hy12)

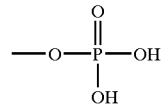
(Hy13)

-continued

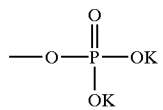
(Hy14)

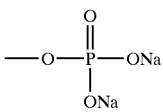
(Hy15)

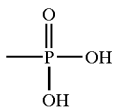
(Hy16)

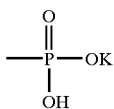
(Hy17)

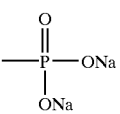
(Hy18)

—NH$_2$ (Hy19)

—NH$_3$Cl (Hy20)

—N(CH$_3$)$_3$Cl (Hy21)

—NH—NH$_2$ (Hy22)

—CO—NH$_2$ (Hy23)

—CO—NH—NH$_2$ (Hy24)

—(CH$_2$CH$_2$O)$_{\overline{n}}$—H (Hy25)
(n = 2-30)

—(CH$_2$CH$_2$O)$_{\overline{n}}$—CH$_3$ (Hy26)
(n = 3-30)

The hydrophilic group is preferably not directly attached to the main chain of the denatured polyvinyl alcohol. In other words, a linking group preferably intervenes between the main chain and the hydrophilic group. Examples of the linking groups include —O—, —O—CO—, —O—CO—NH—, —O—CO—NH-alkylene-, —O—CO—NH-alkylene-O—, —O—CO—NH-alkylene-CO—O—, —O—CO—NH-alkylene-O—CO—, —O—CO—NH-alkylene-CO—NH—, —O—CO—NH-arylene-, —O—CO-alkylene-, —O—CO-alkenylene-, —O—CO-arylene-, —O—CO-alkylene-O—CO—, —O—CO-arylene-O-alkylene-O—CO—, —O—CO-arylene-O-alkylene-O—, —O—CO-arylene-O-alkylene-, —O-alkylene- and —O-alkylene-O—CO—, in which the left side is attached to the main chain, and the right side is attached to the hydrophilic group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The arylene group preferably is phenylene or naphthylene, more preferably is phenylene, and most preferably is p-phenylene. The arylene group can have a substituent group. Examples of the substituent groups are the same as those described about the polymerizable group.

The denatured polyvinyl alcohol can have two or more hydrophilic groups. The denatured polyvinyl alcohol can have two or more kinds of hydrophilic groups (namely an amphoteric hydrophilic group).

A repeating unit having the hydrophilic group is preferably represented by the formula (IV).

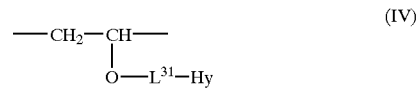
(IV)

In the formula (IV), L$^{31}$ is a single bond or a divalent linking group selected from the group consisting of —CO—, —CO—NH—, —CO—NH-alkylene-, —CO—NH-alkylene-O—, —CO—NH-alkylene-CO—O—, —CO—NH-alkylene-O—CO—, —CO—NH-alkylene-CO—NH—, —CO—NH-arylene-, —CO-alkylene-, —CO-alkenylene-, —CO-arylene-, —CO-alkylene-O—CO—, —CO-arylene-O-alkylene-O—CO—, —CO-arylene-O-alkylene-O—, —CO-arylene-O-alkylene-, -alkylene- and -alkylene-O—CO—.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The arylene group preferably is phenylene or naphthylene, more preferably is phenylene, and most preferably is p-phenylene. The arylene group can have a substituent group. Examples of the substituent groups are the same as those described about the polymerizable group.

In the formula (IV), Hy is a hydrophilic group, which has a hydrophilic characteristic stronger than that of hydroxyl in polyvinyl alcohol. The examples of the hydrophilic groups are described above.

Examples of the repeating units having a hydrophilic group are shown below.

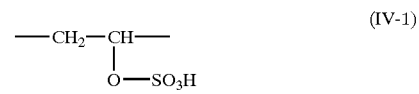
(IV-1)

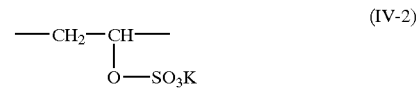
(IV-2)

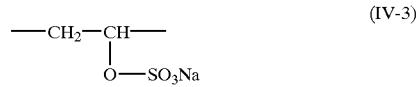
(IV-3)

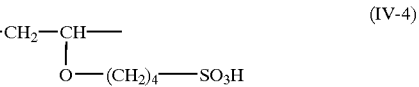
(IV-4)

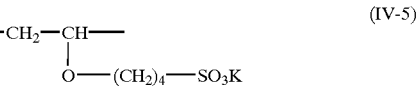
(IV-5)

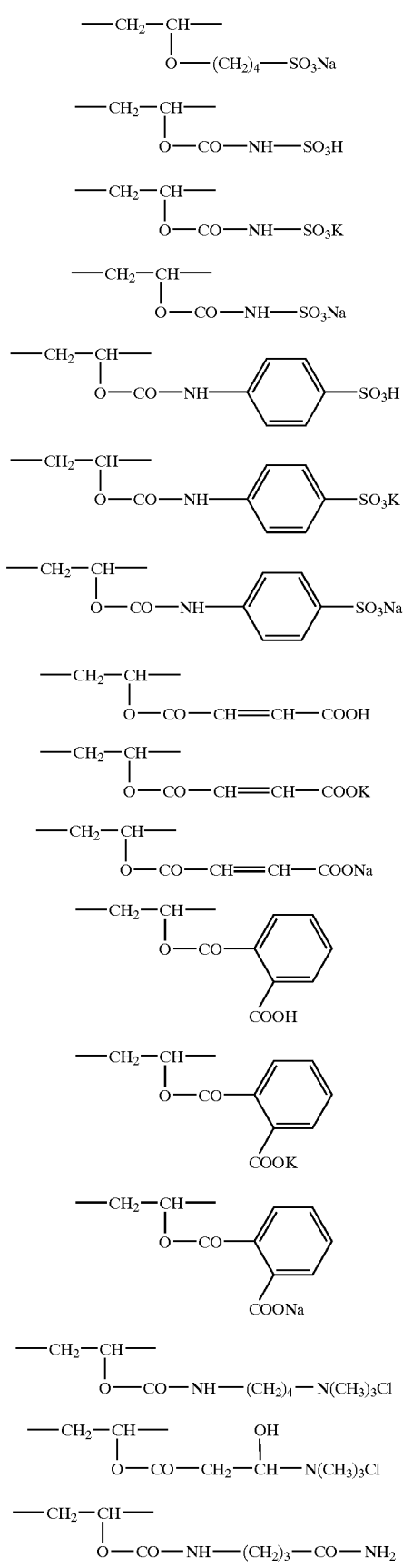

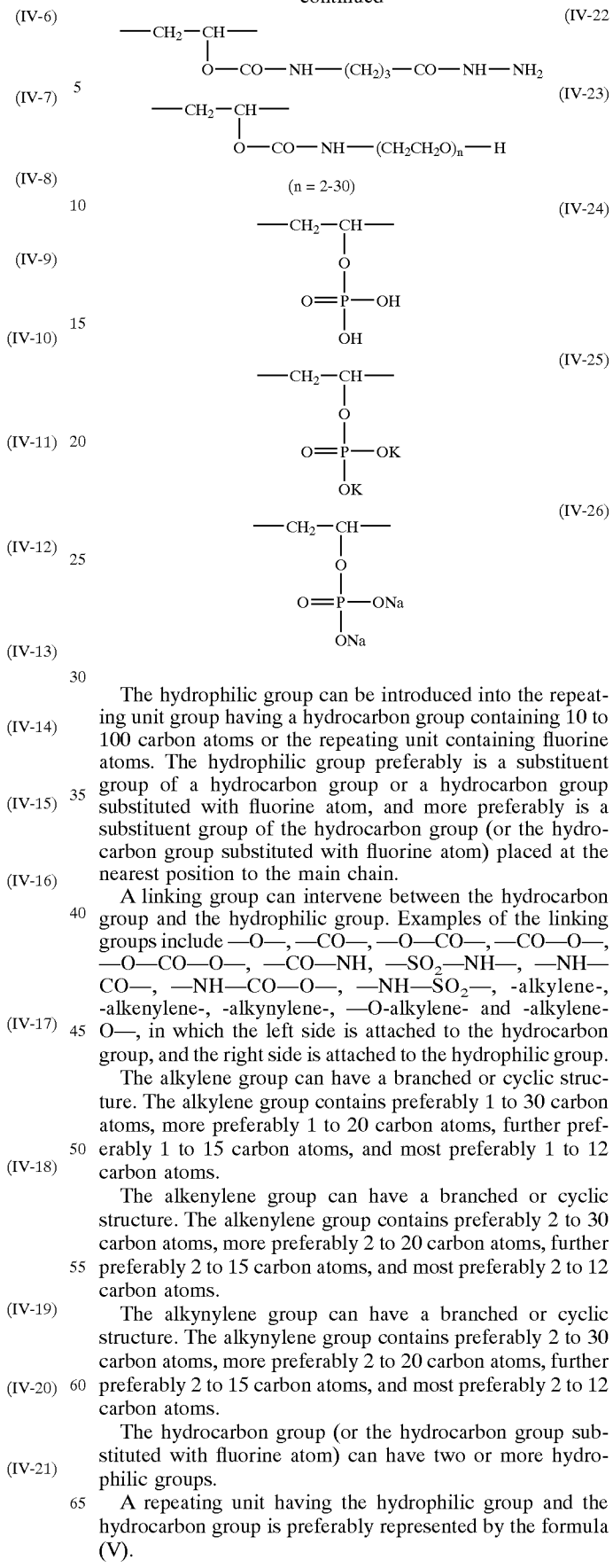

The hydrophilic group can be introduced into the repeating unit group having a hydrocarbon group containing 10 to 100 carbon atoms or the repeating unit containing fluorine atoms. The hydrophilic group preferably is a substituent group of a hydrocarbon group or a hydrocarbon group substituted with fluorine atom, and more preferably is a substituent group of the hydrocarbon group (or the hydrocarbon group substituted with fluorine atom) placed at the nearest position to the main chain.

A linking group can intervene between the hydrocarbon group and the hydrophilic group. Examples of the linking groups include —O—, —CO—, —O—CO—, —CO—O—, —O—CO—O—, —CO—NH, —SO$_2$—NH—, —NH—CO—, —NH—CO—O—, —NH—SO$_2$—, -alkylene-, -alkenylene-, -alkynylene-, —O-alkylene- and -alkylene-O—, in which the left side is attached to the hydrocarbon group, and the right side is attached to the hydrophilic group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The alkynylene group can have a branched or cyclic structure. The alkynylene group contains preferably 2 to 30 carbon atoms, more preferably 2 to 20 carbon atoms, further preferably 2 to 15 carbon atoms, and most preferably 2 to 12 carbon atoms.

The hydrocarbon group (or the hydrocarbon group substituted with fluorine atom) can have two or more hydrophilic groups.

A repeating unit having the hydrophilic group and the hydrocarbon group is preferably represented by the formula (V).

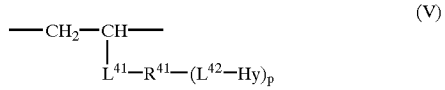

(V)

In the formula (V), $L^{41}$ is a divalent linking group selected from the group consisting of —O—, —CO—, —SO$_2$—, —NH—, -alkylene-, -arylene- and a combination thereof. $L^{41}$ is the same as $L^1$ in the formula (HyC-I) or (FRU-I).

In the formula (V), $R^{41}$ is a hydrocarbon group containing 10 to 100 carbon atoms or a hydrocarbon group substituted with fluorine atom. The hydrocarbon group containing 10 to 100 carbon atoms is the same as $R^1$ in the formula (HyC-I). The hydrocarbon group containing fluorine atom is the same as $Rf^1$ in the formula (FRU-I).

In the formula (V), $L^{42}$ is a single bond or a divalent linking group selected from the group consisting of —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene, —O-alkylene- and -alkylene-O—.

The alkylene group, the alkenylene group and the alkylene group are the same as those described above.

In the formula (V), Hy is a hydrophilic group. The hydrophilic groups are the same as those described above.

In the formula (V), p is 1, 2 or 3, preferably is 1 or 2, and more preferably is 1.

In the case that a repeating unit having a hydrophilic group is introduced into a denatured polyvinyl alcohol, the polyvinyl alcohol preferably contains the hydrophilic repeating units in an amount of 3 to 90 mol %, and more preferably in an amount of 4 to 70 mol %.

In the case that a repeating unit having a hydrocarbon group (or a hydrocarbon group substituted with fluorine atom) and a hydrophilic group is introduced into a denatured polyvinyl alcohol, the polyvinyl alcohol preferably contains the hydrophilic hydrocarbon repeating units in an amount of 2 to 80 mol %, and more preferably in an amount of 3 to 50 mol %.

A denatured polyvinyl alcohol having (1) a repeating unit having a hydrocarbon group (or a hydrocarbon group substituted with fluorine atom), and (4) a repeating unit having a hydrophilic group is preferably represented by the formula (PVIV):

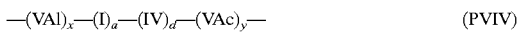

(PVIV)

in which VAl is a vinyl alcohol repeating unit; I is a repeating unit having a hydrocarbon group containing 10 to 100 carbon atoms or a repeating unit having a hydrocarbon group substituted with fluorine atom; IV is a repeating unit having a hydrophilic group; VAc is a vinyl acetate repeating unit; x is 20 to 95 mol % (preferably 30 to 95 mol %); a is 2 to 80 mol % (preferably 3 to 50 mol %); d is 3 to 90 mol % (preferably 4 to 70 mol %); and y is 0 to 30 mol % (preferably 1 to 20 mol %).

A denatured polyvinyl alcohol having (5) a repeating unit having a hydrocarbon group (or a hydrocarbon group substituted with fluorine atom) and a hydrophilic group is preferably represented by the formula (PVV):

(PVV)

in which VAl is a vinyl alcohol repeating unit; V is a repeating unit having a hydrophilic group and a hydrocarbon group containing 10 to 100 carbon atoms or a repeating unit having a hydrophilic group and a hydrocarbon group substituted with fluorine atom; VAc is a vinyl acetate repeating unit; x is 20 to 95 mol % (preferably 30 to 95 mol %); e is 2 to 80 mol % (preferably 3 to 50 mol %); and y is 0 to 30 mol % (preferably 1 to 20 mol %).

A denatured polyvinyl alcohol can have a combination of the above-described repeating units. Accordingly, the present invention can use a denatured polyvinyl alcohol having the repeating units (1) and (5), a denatured polyvinyl alcohol having the repeating units (4) and (5), or a denatured polyvinyl alcohol having the repeating units (1), (4) and (5).

The denatured polyvinyl alcohol can be prepared according to a conventional method. For example, polyvinyl alcohol can be denatured by reacting hydroxyl (—OH) of polyvinyl alcohol with a carbonyl acid corresponding to an additional side chain (HOOC-side chain) to form an additional repeating unit having an ester bond (main chain-O—CO-side chain). Polyvinyl alcohol can also be denatured by reacting hydroxyl with an aldehyde corresponding to a side chain to form an additional repeating unit having an acetal bond. The other denatured polyvinyl alcohol can also be prepared in a similar manner.

The denatured polyvinyl alcohol has a polymerization degree preferably in the range of 200 to 5,000, and more preferably in the range of 300 to 3,000. The denatured polyvinyl alcohol has a molecular weight preferably in the range of 9,000 to 200,000, and more preferably in the range of 13,000 to 130,000.

Two or more denatured polyvinyl alcohols can be used in combination.

The denatured polyvinyl alcohol can have a cross-linked structure. A cross-linking reaction is preferably conducted simultaneously with or after coating a solution of the orientation layer on a substrate.

The denatured polyvinyl alcohol can be cross-linked by using a cross-linking agent. Examples of the cross-linking agents include an aldehyde, a dioxane (e.g., 2,3-dihydroxydioxane), a carbenium, 2-naphthalate sulfonate, 1,1-bispyrrolidino-1-chloropyridinium, 1-morphorinocarbonyl-3-sulfonatoaminomethyl, an active vinyl compound (e.g., 1,3,5-triacryloyl-hexahydro-s-triazine, bis(vinylsulfone) methane, N,N'-methylenebis-[β-(vinylsulfonyl) propionamide), an active halogen compound (e.g., 2,4-dichloro-6-hydroxy-s-triazine) and an isooxazole. An aldehyde (e.g., formaldehyde, glyoxal, glutaraldehyde, malonaldehyde, phthalaldehyde, terephthalaldehyde, succinaldehyde, isophthalaldehyde, dialdehyde starch) is preferred., an aldehyde having two or more functional groups is more preferred, and an aldehyde having two functional groups is most preferred.

An acetal reaction is caused between the aldehyde and hydroxyl of a denatured polyvinyl alcohol to cross-link the denatured polyvinyl alcohol. A cross-linked repeating unit obtained by an aldehyde having two functional groups (two aldehydo groups) is shown in the following formula (VI):

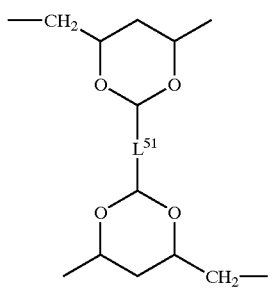

(VI)

in which $L^{51}$ is a divalent linking group, which bound the two aldehydo groups in the aldehyde.

The acetal reaction of aldehyde and hydroxyl proceeds in an acidic condition. An inorganic acid (e.g., sulfuric acid, hydrochloric acid, nitric acid, phosphoric acid) or an organic acid (e.g., dichloroacetic acid, trifluoroacetic acid, methanesulfonic acid, p-toluenesulfonic acid, benzenesulfonic acid, monochloroacetic acid) is preferably added to a coating solution of an orientation layer to obtain an acidic reaction condition.

The coating amount of the cross-linking agent is preferably in the range of 0.1 to 20 wt. %, and more preferably in the range of 0.5 to 15 wt. %, based on the total coating amount of the orientation layer. The amount of the remaining (not reacted) cross-linking agent is preferably not more than 1.0 wt. %, and more preferably not more than 0.5 wt. %, based on the coating amount of the orientation layer.

The orientation layer has a thickness preferably in the range of 0.1 to 10 μm.

The orientation layer is preferably formed by rubbing the polymer. The rubbing treatment can be conducted by rubbing a layer containing the denatured polyvinyl alcohol with a paper or cloth several times along a certain direction.

After aligning liquid crystal molecules by the orientation layer, the alignment of the liquid crystal molecules can be kept without the orientation layer. For examples, an aligned optically anisotropic layer (without the orientation layer) can be transferred on a transparent substrate to prepare an optical compensatory sheet.

[Liquid Crystal Layer]

The liquid crystal molecules are contained in a liquid crystal layer to be aligned by using the above-described orientation layer. The orientation layer has a function of aligning the liquid crystal molecule essentially vertically (at an average inclined angle in the range of 50° to 90°).

The liquid crystal molecule preferably is a rod-like liquid crystal molecule or a discotic liquid crystal molecule. The inclined angle of the rod-like liquid crystal molecule means an angle between a long axis of a rod-like liquid crystal molecule and a surface of a substrate (or a surface of an orientation layer). The inclined angle of the discotic liquid crystal molecule means an angle between a discotic plane of a discotic liquid crystal molecule and a surface of a substrate (or a surface of an orientation layer).

In the case that a liquid crystal element is used as a liquid crystal cell, rod-like liquid crystal molecules are preferably used.

Examples of the rod-like liquid crystal molecules include azomethines, azoxys, cyanobiphenyls, cyanophenyl esters, benzoic esters, phenyl cyclohexanecarboxylates, cyanophenylcyclohexanes, cyanophenylpyridines, alkoxyphenylpyridines, alkoxyphenylpyrimidines, phenyldioxanes, tolanes and alkenylcyclohexylbenzonitriles.

A representative liquid crystal cell containing vertically aligned rod-like liquid crystal molecules is a liquid crystal cell of a vertically aligned (VA) mode. A liquid crystal display having the cell of the VA mode is described in Nikkei Microdevice No. 136, page 147 (written in Japanese, 1996), Japanese Patent Provisional Publication No. 2(1990)-176625 and Japanese Patent No. 2,866,372.

[Optically Anisotropic Layer]

In the case that the liquid crystal element is used as an optical compensatory sheet, the liquid crystal layer functions as an optical anisotropic layer. The optically anisotropic layer preferably comprises rod-like liquid crystal molecules or discotic liquid crystal molecules, and more preferably comprises discotic liquid crystal molecules.

In the optically anisotropic layer, discotic planes of discotic liquid crystal molecules are aligned essentially vertically to the orientation layer (at an average inclined angle in the range of 50° to 90°). The discotic liquid crystal molecules are preferably fixed in the optical anisotropic layer while keeping the vertical (homogeneous) alignment. The discotic liquid crystal molecules are preferably fixed by a polymerization reaction.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula.

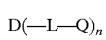

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

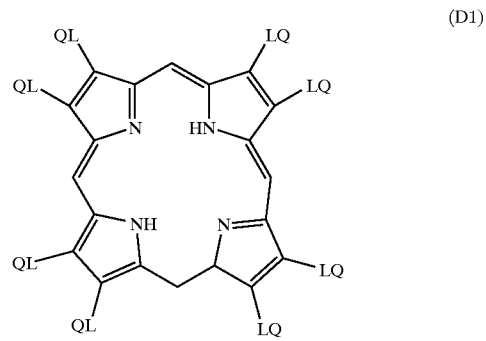

(D1)

(D2) 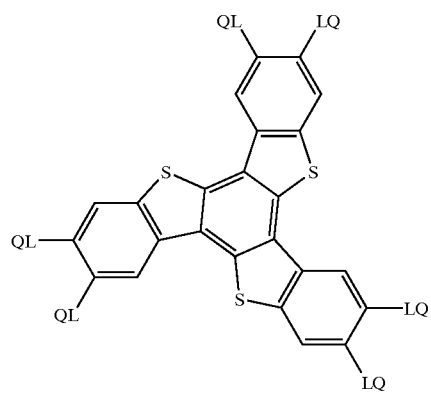
(D3) 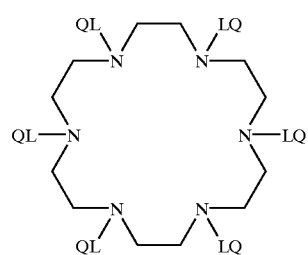
(D4) 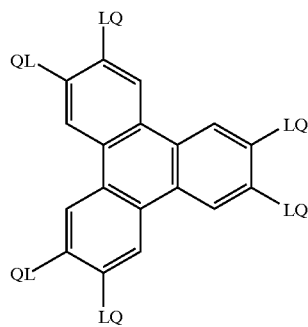
(D5) 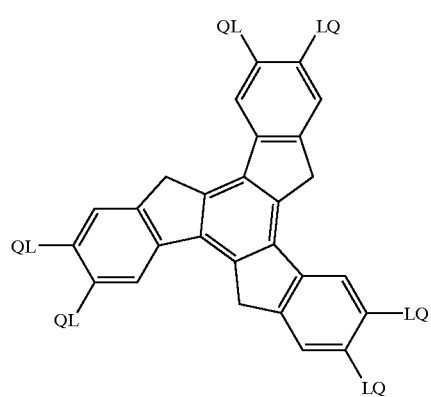
(D6) 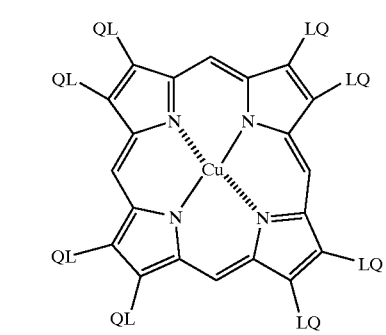
(D7) 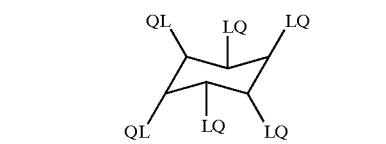
(D8) 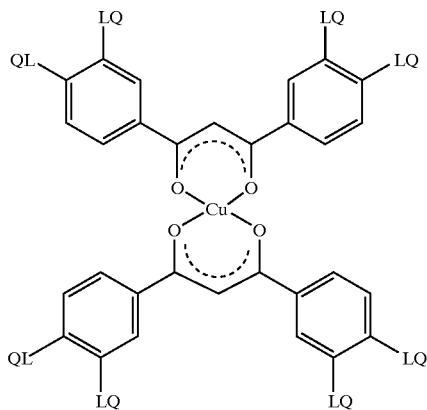
(D9) 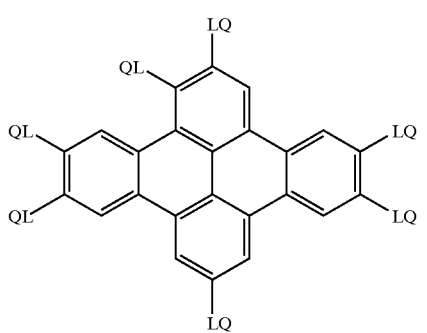
(D10)

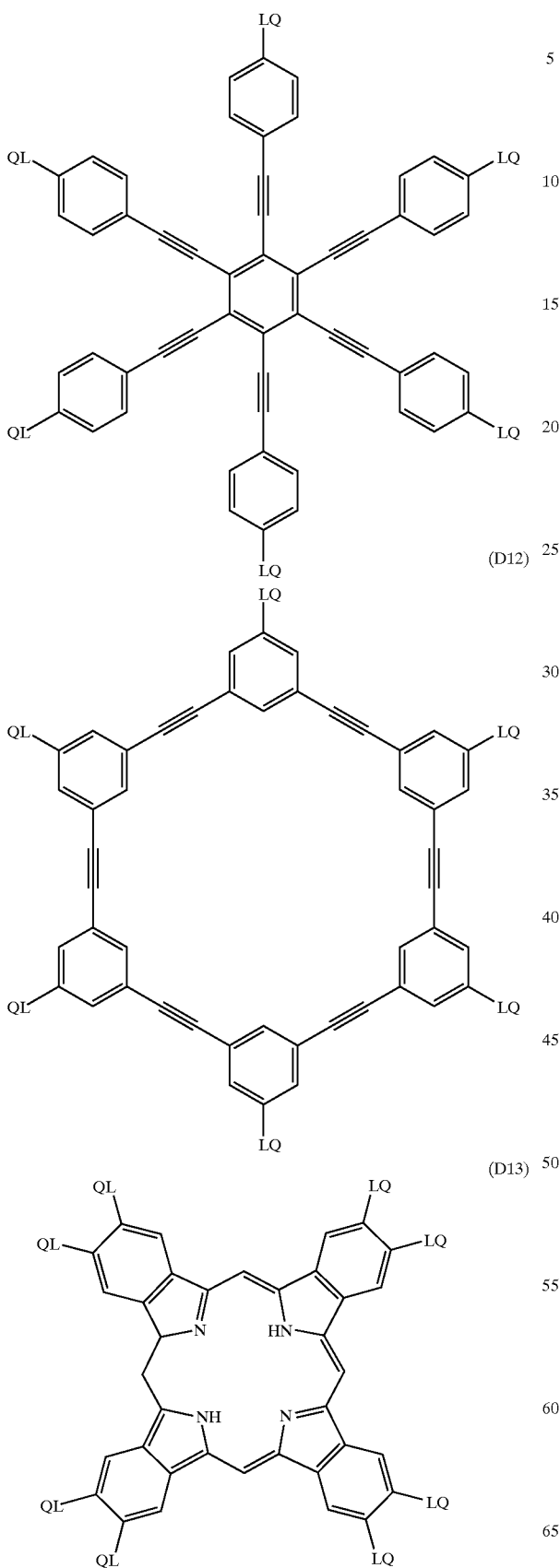

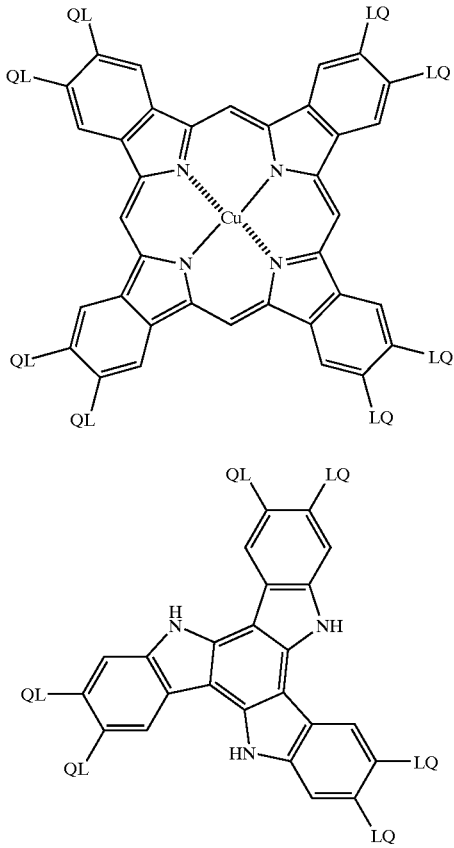

In the formula, the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

L1: —AL—CO—O—AL—O—CO—

L2: —AL—CO—O—AL—O—

L3: —AL—CO—O—AL—O—AL—

L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The discotic liquid crystal molecules can be spirally twisted by introducing asymmetric carbon atom into the molecules, preferably into AL (an alkylene group or an alkenylene group) of the divalent linking group (L). Examples of AL* containing asymmetric carbon atoms are shown below. In the examples, the left side is adjacent to the discotic core (D), and the right side is adjacent to the polymerizable group (Q). The carbon atom (C) with the mark (*) is the asymmetric carbon atom. The optical activity can be S or R.

AL*1: —CH$_2$CH$_2$—C*HCH$_3$—CH$_2$CH$_2$CH$_2$—
AL*2: —CH$_2$CH$_2$CH$_2$—C*HCH$_3$—CH$_2$CH$_2$—
AL*3: —CH$_2$—C*HCH$_3$—CH$_2$CH$_2$CH$_2$CH$_2$—
AL*4: —C*HCH$_3$—CH$_2$CH$_2$CH$_2$CH$_2$CH$_2$—
AL*5: —CH$_2$CH$_2$CH$_2$CH$_2$—C*HCH$_3$—CH$_2$—
AL*6: —CH$_2$CH$_2$CH$_2$CH$_2$CH$_2$—C*HCH$_3$—
AL*7: —C*HCH$_3$—CH$_2$CH$_2$CH$_2$CH$_2$—
AL*8: —CH$_2$—C*HCH$_3$—CH$_2$CH$_2$CH$_2$—
AL*9: —CH$_2$CH$_2$—C*HCH$_3$—CH$_2$CH$_2$—
AL*10: —CH$_2$CH$_2$CH$_2$—C*HCH$_3$—CH$_2$—
AL*11: —CH$_2$CH$_2$CH$_2$CH$_2$—C*HCH$_3$—
AL*12: —C*HCH$_3$—CH$_2$CH$_2$CH$_2$—
AL*13: —CH$_2$—C*HCH$_3$—CH$_2$CH$_2$—
AL*14: —CH$_2$CH$_2$—C*HCH$_3$—CH$_2$—
AL*15: —CH$_2$CH$_2$CH$_2$—C*HCH$_3$—
AL*16: —CH$_2$—C*HCH$_3$—
AL*17: —C*HCH$_3$—CH$_2$—
AL*18: —C*HCH$_3$—CH$_2$CH$_2$CH$_2$CH$_2$CH$_2$CH$_2$—
AL*19: —CH$_2$—C*HCH$_3$—CH$_2$CH$_2$CH$_2$CH$_2$CH$_2$—
AL*20: —CH$_2$CH$_2$—C*HCH$_3$—CH$_2$CH$_2$CH$_2$CH$_2$—
AL*21: —CH$_2$CH$_2$CH$_2$—C*HCH$_3$—CH$_2$CH$_2$CH$_2$—
AL*22: —C*HCH$_3$—CH$_2$CH$_2$CH$_2$CH$_2$CH$_2$CH$_2$CH$_2$—
AL*23: —CH$_2$—C*HCH$_3$—CH$_2$CH$_2$CH$_2$CH$_2$CH$_2$CH$_2$—
AL*24: —CH$_2$CH$_2$—C*HCH$_3$—CH$_2$CH$_2$CH$_2$CH$_2$CH$_2$—
AL*25: —CH$_2$CH$_2$CH$_2$—C*HCH$_3$—CH$_2$CH$_2$CH$_2$CH$_2$—
AL*26: —C*HCH$_3$—CH$_2$CH$_2$CH$_2$CH$_2$CH$_2$CH$_2$CH$_2$CH$_2$—
AL*27: —CH$_2$—C*HCH$_3$—CH$_2$CH$_2$CH$_2$CH$_2$CH$_2$CH$_2$CH$_2$CH$_2$—
AL*28: —CH$_2$—C*HCH$_2$CH$_3$—
AL*29: —CH$_2$—C*HCH$_2$CH$_3$—CH$_2$—
AL*30: —CH$_2$—C*HCH$_2$CH$_3$—CH$_2$CH$_2$—
AL*31: —CH$_2$—C*HCH$_2$CH$_3$—CH$_2$CH$_2$CH$_2$CH$_2$—
AL*32: —CH$_2$—C*H(n-C$_3$H$_7$)—CH$_2$CH$_2$—
AL*33: —CH$_2$—C*H(n-C$_3$H$_7$)—CH$_2$CH$_2$CH$_2$CH$_2$—
AL*34: —CH$_2$—C*H(OCOCH$_3$)—CH$_2$CH$_2$—
AL*35: —CH$_2$—C*H(OCOCH$_3$)—CH$_2$CH$_2$CH$_2$— polymerization reaction. Examples of the polymerizable groups (Q) are shown below.

 (Q1)

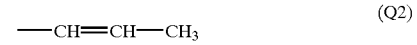 (Q2)

 (Q3)

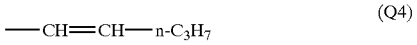 (Q4)

 (Q5)

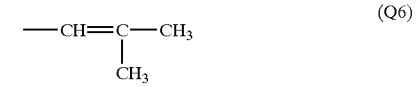 (Q6)

 (Q7)

 (Q8)

 (Q9)

 (Q10)

 (Q11)

 (Q12)

 (Q13)

 (Q14)

 (Q15)

 (Q16)

 (Q17)

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula, n is an integer of 4 to 12, which is determined by the chemical structure of the discotic core (D). The 4 to 12 combinations of L and Q can be different from each other. However, the combinations are preferably identical.

Two or more discotic liquid crystal molecules can be used in combination. For example, a molecule containing asymmetric carbon atom in the divalent linking group (L) can be used in combination with a molecule containing no asymmetric carbon atom. Further, a molecule having a polymerizable group (Q) can be used in combination with a molecule having no polymerizable group. A molecule containing asymmetric carbon atom and having no polymerizable group is preferably used in combination with a molecule having a polymerizable group and containing no asymmetric carbon atom. The last combination can also be considered that only a molecule having a polymerizable group and containing no asymmetric carbon atom functions as a discotic liquid crystal molecule, while a molecule containing asymmetric carbon atom and having no polymerizable group functions as a chiral agent (described below).

The discotic liquid crystal molecule having no polymerizable group is obtained by replacing the polymerizable group (Q) of the above-described polymerizable discotic liquid crystal molecule with hydrogen or an alkyl group. Accordingly, the discotic liquid crystal molecule having no polymerizable group preferably is a compound represented by the following formula.

D(—L—R)$_n$ in which D is a discotic core; L is a divalent linking group; R is hydrogen or an alkyl group; and n is an integer of 4 to 12.

Examples of the discotic cores are the same as the examples of the cores in the polymerizable discotic liquid crystal molecule, except that LQ or QL is replaced with LR or RL.

Examples of the divalent linking groups are also the same as the examples of the linking groups in the polymerizable discotic liquid crystal molecule.

The alkyl group of R contains preferably 1 to 40 carbon atoms, and more preferably 1 to 30 carbon atoms. An alkyl group preferably has a chain structure rather than a cyclic structure. An alkyl group having a straight chain (normal alkyl group) is preferred to a branched alkyl group. R preferably is hydrogen or a normal alkyl group having 1 to 30 carbon atoms.

In place of introducing asymmetric carbon atom into the divalent linking group of the discotic liquid crystal molecule, the discotic liquid crystal molecules can also be spirally twisted by adding an optical active compound containing asymmetric carbon atom (chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously) aligned. The chiral agent having a polymerizable group can also be fixed by the same or a similar polymerization reaction.

The optically anisotropic layer can further contain a fluorine containing surface active agent or a cellulose ester, which has a function of uniformly and essentially vertically (homogeneously) aligning discotic liquid crystal molecules placed near an interface between the layer and the air.

The fluorine containing surface active agent comprises a hydrophobic group containing fluorine, a nonionic, anionic, cationic or amphoteric hydrophilic group and an optional linking group.

The fluorine containing surface active agent comprising one hydrophobic group and one hydrophilic group is represented by the following formula.

Rf—L$^5$—Hy in which Rf is a monovalent hydrocarbon group substituted with fluorine; L$^5$ is a single bond or divalent linking group; and Hy is a hydrophobic group.

Rf in the formula functions as a hydrophobic group. The hydrocarbon group preferably is an alkyl group or an aryl group. The alkyl group preferably has 3 to 30 carbon atoms. The aryl group preferably has 6 to 30 carbon atoms.

All or a part of hydrogen atoms contained in the hydrocarbon group is substituted with fluorine. At least 50% of hydrogen atomss are preferably substituted with fluorine. More preferably at least 60%, further preferably at least 70%, and most preferably at least 80% of hydrogen atoms are substituted with fluorine.

The other hydrogens may be substituted with other halogen atoms (e.g., chlorine, bromine).

Examples of Rf are shown below.

Rf1: n-C$_8$F$_{17}$—
Rf2: n-C$_6$F$_{13}$—
Rf3: Cl—(CF$_2$—CFCl)$_3$—CF$_2$—
Rf4: H—(CF$_2$)$_8$—
Rf5: H—(CF$_2$)$_{10}$—
Rf6: n-C$_9$F$_{19}$—
Rf7: Pentafluorophenyl
Rf8: n-C$_7$F$_{15}$—
Rf9: Cl—(CF$_2$—CFCl)$_2$—CF$_2$—
Rf10: H—(CF$_2$)$_4$—
Rf11: H—(CF$_2$)$_6$—
Rf12: Cl—(CF$_2$)$_6$—
Rf13: C$_3$F$_7$—

In the formula, the divalent linking group is preferably selected from the group consisting of an alkylene group, an arylene group, a divalent heterocyclic group, —CO—, —NR— (in which R is hydrogen or an alkyl group having 1 to 5 carbon atoms), —O—, —SO$_2$— and a combination thereof.

Examples of L$^4$ in the formula are shown below. In the following examples, the left side is attached to a hydrophobic group (Rf) and the right side is attached to a hydrophilic group (Hy). AL means an alkylene group, AR means an arylene group, and Hc means a heterocyclic group. The alkylene group, the arylene group and the heterocyclic group may have a substituent group (e.g., an alkyl group).

L0: a single bond
L51: —SO$_2$—NR—
L52: —AL—O—
L53: —CO—NR—
L54: —AR—O—
L55: —SO$_2$—NR—AL—CO—O—
L56: —CO—O—
L57: —SO$_2$—NR—AL—O—
L58: —SO$_2$—NR—AL—
L59: —CO—NR—AL—
L60: —AL$^1$—O—AL$^2$—
L61: —Hc—AL—
L62: —SO$_2$—NR—AL$^1$—O—AL$^2$—
L63: —AR—
L64: —O—AR—SO$_2$—NR—AL—
L65: —O—AR—SO$_2$—NR—
L66: —O—AR—O—

Hy in the formula is a nonionic hydrophilic group, an anionic hydrophilic group, a cationic hydrophilic group or a combination thereof (an amphoteric hydrophilic group). A nonionic hydrophilic group is particularly preferred.

Examples of Hy are shown below.

Hy1: —(CH$_2$CH$_2$O)$_n$—H (n: an integer of 5 to 30)
Hy2: —(CH$_2$CH$_2$O)$_n$—R$^1$ (n: an integer of 5 to 30, R$^1$: an alkyl group having 1 to 6 carbon atoms)

Hy3: —$(CH_2CHOHCH_2)_n$—H (n: an integer of 5 to 30)

Hy4: —COOM (M: hydrogen, an alkali metal atom or dissociated)

Hy5: —$SO_3M$ (M: hydrogen, an alkali metal atom or dissociated)

Hy6: —$(CH_2CH_2O)_n$—$CH_2CH_2CH_2$—$SO_3M$ (n: an integer of 5 to 30, M; hydrogen or an alkali metal atom)

Hy7: —$OPO(OH)_2$

Hy8: —$N^+(CH_3)_3.X^-$ (X: a halogen atom)

Hy9: —$COONH_4$

The nonionic hydrophilic groups (Hy1, Hy2, Hy3) are preferred, and the hydrophilic group consisting of polyethylene oxide (Hy1) is particularly preferred.

The fluorine containing surface active agent may have two or more hydrophobic groups containing fluorine or two or more hydrophilic groups. Two or more fluorine containing surface active agents can be used in combination.

The surface active agents are described in various documents, such as Hiroshi Horiguchi, New Surface Active Agents, Sankyo Shuppan, 1975 (written in Japanese), M. J. Schick, Nonionic Surfactants, Marcell Dekker Inc., New York, 1967 and Japanese Patent Provisional Publication No. 7(1995)-13293.

The fluorine containing surface active agent is used in an amount of 0.01 to 30 wt. % based on the amount of the discotic liquid crystal molecules. The amount is preferably in the range of 0.05 to 10 wt. %, and more preferably in the range of 0.1 to 5 wt. %.

The cellulose ester preferably is a cellulose ester of a lower fatty acid.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate. Examples of the cellulose esters of the lower fatty acids include cellulose acetate, cellulose propionate, cellulose butyrate, cellulose hydroxypropionate, cellulose acetate propionate and cellulose acetate butyrate. Cellulose acetate butyrate is particularly preferred. Butyric acid content of the cellulose acetate butyrate is preferably not less than 30%, more preferably in the range of 30 to 80%. Acetic acid content of the cellulose acetate butyrate is preferably less than 30%, and more preferably in the range of 1 to 30%.

The coating amount of the cellulose ester is preferably in the range of 0.005 to 0.5 g per $m^2$, more preferably in the range of 0.01 to 0.45 g per $m^2$, further preferably in the range of 0.02 to 0.4 g per $m^2$, and most preferably in the range of 0.03 to 0.35 g per $m^2$. The amount of the cellulose ester is also preferably in the range of 0.1 to 5 wt. % based on the amount of the discotic liquid crystal molecule.

An optically anisotropic layer can be formed by coating a solution containing the discotic liquid crystal molecule and optional components such as the chiral agent, the above-mentioned additive (a fluorine containing surface active agent, a cellulose ester), a polymerization initiator (described below) on an orientation layer.

A solvent for the preparation of the solution preferably is an organic solvent. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as an extrusion coating method, a direct gravure coating method, a reverse gravure coating method, a die coating method or a bar coating method.

The aligned discotic liquid crystal molecules are preferably fixed while keeping the essentially vertical (homogeneous) alignment. The discotic liquid crystal molecules are fixed preferably by a polymerization reaction of the polymerizable groups (Q) in the molecules. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046, 127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray.

The exposure energy is preferably in the range of 20 to 5,000 mJ per $cm^2$, and more preferably in the range of 100 to 800 mJ per $cm^2$. The light irradiation can be conducted while heating the layer to accelerate the photo polymerization reaction.

The optically anisotropic layer has a thickness preferably in the range of 0.1 to 50 $\mu$m, more preferably 1 to 30 $\mu$m, and most preferably in the range of 5 to 20 $\mu$m. In the case that two optical compensatory sheets are used in a liquid crystal display, the preferred thickness of the layer is half of the preferred thickness (described above) in the case that one optical compensatory sheet is used in a liquid crystal display.

The discotic liquid crystal molecules in the optically anisotropic layer are aligned at an average inclined angle in the range of 50° to 90°. The inclined angle is preferably uniform. However, the inclined angle can be changed if the angle is continuously changed along the thickness of the optical anisotropic layer.

The twist angle of the discotic liquid crystal molecules is preferably similar to a twist angle of a liquid crystal cell of an STN mode, which is usually in the range of 180° to 360°, and preferably in the range of 180° to 270°. The difference between the twist angles is preferably not larger than 10°. In the case that one optical compensatory sheet is used in a liquid crystal display, the twist angle of the discotic liquid crystal molecules is preferably in the range of 180° to 360°. In the case that two optical compensatory sheets are used in a liquid crystal display, the twist angle of the discotic liquid crystal molecules is preferably in the range of 90° to 180°. In a liquid crystal display of an STN mode, a wavelength dependency of the birefringence ($\Delta n(\lambda)$) of an optically anisotropic layer is preferably similar to a wavelength dependency of the birefringence of a liquid crystal cell of an STN mode.

[Liquid Crystal Display]

The present invention is particularly effective in a liquid crystal display of an STN mode.

The liquid crystal display of an STN mode comprises a liquid crystal cell of an STN mode, two polarizing elements arranged on each side of the liquid crystal cell, and one or two optical compensatory sheets arranged between the liquid crystal cell and the polarizing element.

The alignment of rod-like liquid crystal molecule in the liquid crystal cell and the alignment of the discotic liquid crystal molecules in the optical compensatory sheet is preferably so adjusted that a director of a rod-like liquid crystal molecule adjacent to the optical compensatory sheet is the essentially same direction of a director of the discotic liquid crystal molecule adjacent to the liquid crystal cell. The director of the rod-like liquid crystal molecule means the direction of the long axis of the rod-like molecule. The director of the discotic liquid crystal molecule means the direction of a normal line of the discotic core plane. The essentially same direction means that the angle between the directors viewed along a normal line of the liquid crystal cell.

The transparent substrate of the optical compensatory sheet can be used as a protective film of a polarizing plate (on the side facing the liquid crystal cell). In this case, a slow axis (direction showing the maximum refractive index) of the transparent substrate is preferably so arranged that the slow axis is essentially perpendicular or parallel to the transmission axis (direction showing the maximum transmittance) of the polarizing plate. The term "essentially perpendicular or parallel" means that a margin for error based on the exact angle is in the range of ±10°.

EXAMPLE 1

A triacetyl cellulose film (thickness: 100 μm, size: 270 mm×100 mm, Fuji Tac, Fuji Photo Film Co., Ltd.) was used as a transparent substrate.

A denatured polyvinyl alcohol (PV1) having a hydrocarbon group was dissolved in a mixture of methanol and water (volume ratio: 50/50) to prepare a 5 wt. % solution. The solution was coated on the transparent substrate by using a bar coater (thickness: 1 μm), and air-dried at 60° C. for 2 minutes. The surface was subjected to a rubbing treatment to form an orientation layer.

Denatured Polyvinyl Alcohol (PV1)

Denatured polyvinyl alcohol (PV1)

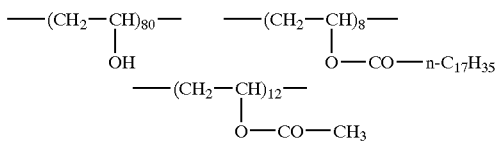

The following coating solution was coated on the orientation layer according to an extrusion method.

| Coating solution for optically anisotropic layer | |
|---|---|
| The following discotic liquid crystal compound (1) | 80 weight parts |
| The following discotic liquid crystal compound (2) | 20 weight parts |
| The following fluorine containing surface active agent | 0.1 weight part |
| A photopolymerization initiator (Irgacure 907, Ciba-Geigy) | 0.2 weight part |
| Methyl ethyl ketone | 185 weight parts |

Discotic liquid crystal compound (1)

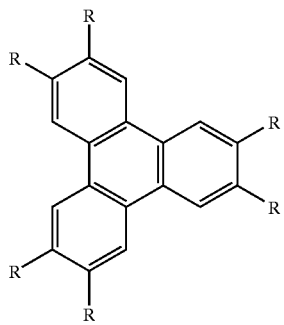

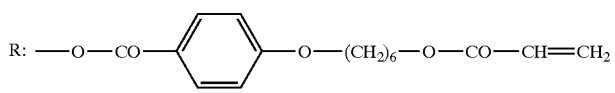

Discotic liquid crystal compound (2)

-continued

Coating solution for optically anisotropic layer

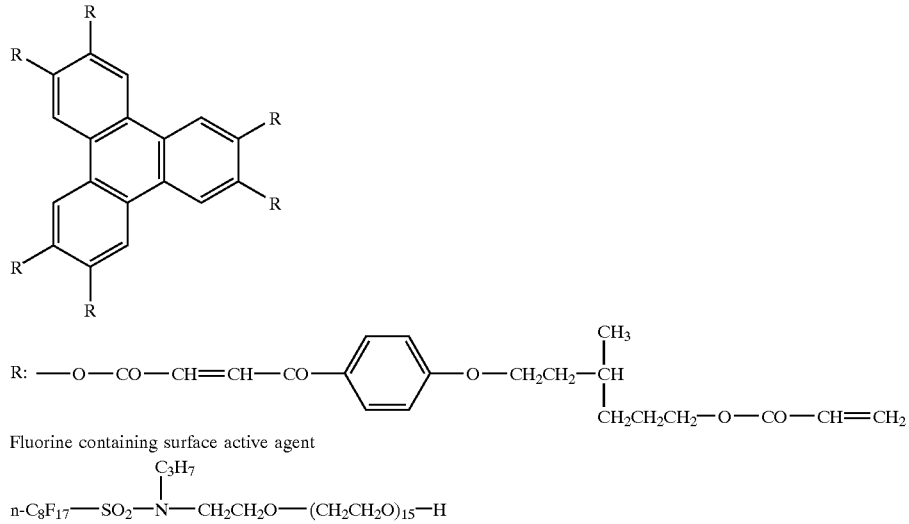

Fluorine containing surface active agent n-C$_8$F$_{17}$—SO$_2$—N(C$_3$H$_7$)—CH$_2$CH$_2$O—(CH$_2$CH$_2$O)$_{15}$—H The coated layer was heated at 130° C. to essentially vertically align the discotic liquid crystal compound. The layer was irradiated with an ultraviolet ray for 4 seconds to polymerize the discotic liquid crystal compound and to fix the alignment. Thus an optical compensatory sheet was prepared. In the optically anisotropic layer, the discotic liquid crystal molecules are twisted, and are essentially vertically aligned.

Polarized light was incident on the transparent substrate of the optical compensatory sheet along a direction of 45° based on the rubbing direction of the orientation layer. Polarization of transmitted light was analyzed (Multi Chanel Photo Analizer, Ohtsuka Electronics Co., Ltd.). As a result, the twist angle was in the range of 230° to 250°.

Another optical compensatory sheet was prepared in the same manner except that the discotic liquid crystal compound (2), which functions as a chiral agent, was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 70° to 85°.

Further, an antiparallel cell was prepared by using a horizontal orientation layer. The discotic liquid crystal compounds (1) and (2) were inserted into the antiparallel cell. The retardation in plane (Re) of the obtained liquid crystal cell was measured by using an ellipsometer. The retardation was divided by the thickness of the cell to determine Δn of 0.07.

EXAMPLE 2

An optical compensatory sheet was prepared and evaluated in the same manner as in Example 1, except that a denatured polyvinyl alcohol (PV25) was used in place of the denatured polyvinyl alcohol (PV1). The average inclined angle of the discotic liquid crystal molecules was 70°.

Denatured polyvinyl alcohol (PV25)

—(CH$_2$—CH)$_{76}$—
        |
        OH
—(CH$_2$—CH)$_{12}$—
        |
        O—CO—CH—NH—SO$_2$—⟨C$_6$H$_4$⟩—O—n-C$_{18}$H$_{37}$
              |
              CH$_3$
—(CH$_2$—CH)$_{12}$—        —S—n-C$_{12}$H$_{25}$
        |
        O—CO—CH$_3$

EXAMPLE 3

An optical compensatory sheet was prepared and evaluated in the same manner as in Example 1, except that a denatured polyvinyl alcohol (PV40) was used in place of the denatured polyvinyl alcohol (PV1). The average inclined angle of the discotic liquid crystal molecules was 60°.

Denatured polyvinyl alcohol (PV40)

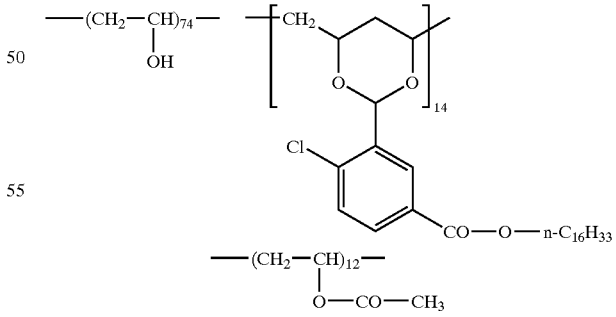

EXAMPLE 4

An optical compensatory sheet was prepared and evaluated in the same manner as in Example 1, except that a denatured polyvinyl alcohol (PV53) was used in place of the denatured polyvinyl alcohol (PV1). The average inclined angle of the discotic liquid crystal molecules was 75°.

Denatured polyvinyl alcohol (PV53)

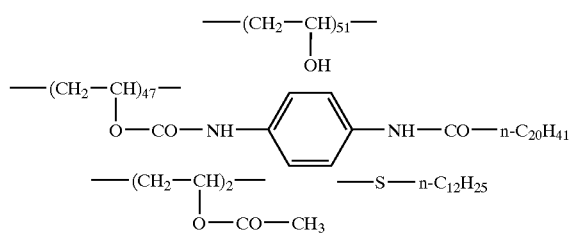

COMPARISON EXAMPLE 1

A commercially available inorganic material for a vertical orientation layer (EXP-OA004, Nissan Chemical Industries Ltd.) was diluted with methanol to a solid content of 2 wt. %. The diluted material was coated on a glass plate by using a bar coater (thickness: 0.4 μm), and dried at 140° C. to form an inorganic orientation layer. The orientation layer was subjected to a rubbing treatment.

Two antiparallel cells were prepared. A rod-like liquid crystal compound (MBBA) was inserted into one cell. A discotic liquid crystal compound (obtained by removing methyl ethyl ketone from the coating solution for optically anisotropic layer used in Example 1) was inserted into the other cell.

The alignment of the liquid crystal molecule was examined. The cell containing the rod-like liquid crystal molecules shows a nematic alignment of the molecules, which is vertical to a glass plate. On the other hand, the average inclined angle of the discotic liquid crystal molecules was 30°. Therefore, the discotic liquid crystal molecules were not vertically (50° to 90°) aligned.

The tested material for a vertical orientation layer (EXP-OA004, Nissan Chemical Industries Ltd.) is commercially available, and is used for preparation of an orientation layer for a rod-like liquid crystal compound. The other commercially available materials for a vertical orientation layer were also tested in the same manner. As a result, vertical orientation layers for a rod-like liquid crystal compound were not effective in aligning a discotic liquid crystal compound vertically.

EXAMPLE 5

A liquid crystal display of an STN mode shown in FIG. 3(e) was prepared by using an optical compensatory sheet prepared in Example 1. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more. Further, a blue or yellow color was not observed in the displayed image.

EXAMPLE 6

An optical compensatory sheet was prepared and evaluated in the same manner as in Example 1, except that the following coating solution for the optically anisotropic layer was used. The results were the same as the results of Example 1.

| Coating solution for optically anisotropic layer | |
|---|---|
| The following discotic liquid crystal compound (3) | 63 weight parts |
| The discotic liquid crystal compound (2) used in Example 1 | 27 weight parts |
| The following polymerizable plasticizer | 10 weight parts |
| A photopolymerization initiator (Irgacure 907, Ciba-Geigy) | 1 weight part |
| Cellulose acetate butyrate (CAB551-0.2, Eastman Chemical) | 0.5 weight part |
| Methyl ethyl ketone | 184.5 weight parts |

Discotic liquid crystal compound (3)

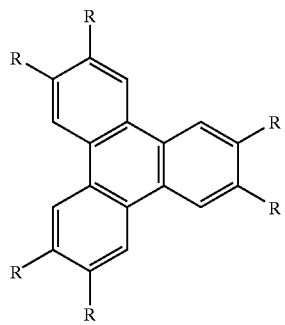

-continued

Coating solution for optically anisotropic layer

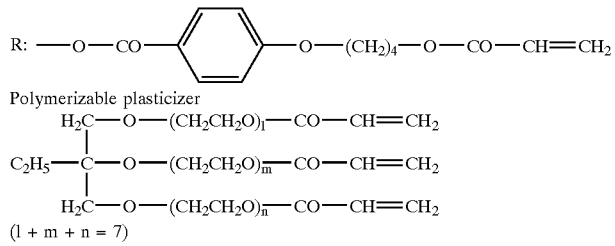

Polymerizable plasticizer

H$_2$C—O—(CH$_2$CH$_2$O)$_l$—CO—CH=CH$_2$
|
C$_2$H$_5$—C—O—(CH$_2$CH$_2$O)$_m$—CO—CH=CH$_2$
|
H$_2$C—O—(CH$_2$CH$_2$O)$_n$—CO—CH=CH$_2$ (l + m + n = 7)

EXAMPLE 7

A triacetyl cellulose film (thickness: 100 μm, size: 270 mm×100 mm, Fuji Tac, Fuji Photo Film Co., Ltd.) was used as a transparent substrate.

A denatured polyvinyl alcohol (PV101) having a steroid hydrocarbon group was dissolved in a mixture of methanol and water (volume ratio: 50/50) to prepare a 5 wt. % solution. The solution was coated on the transparent substrate by using a bar coater (thickness: 1 μm), and air-dried at 80° C. for 10 minutes. The surface was subjected to a rubbing treatment to form an orientation layer.

Denatured polyvinyl alcohol (PV101)

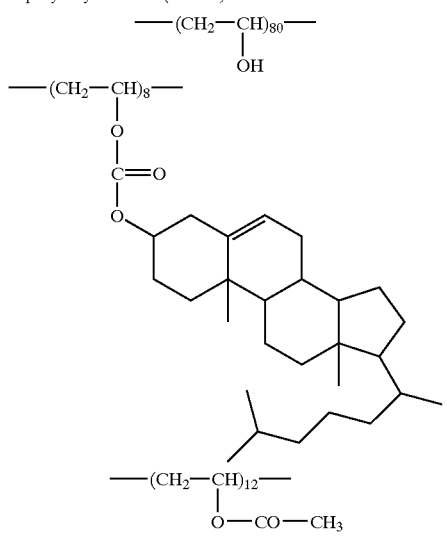

An optically anisotropic layer was formed on the orientation layer in the same manner as in Example 1 to prepare an optical compensatory sheet.

Polarized light was incident on the transparent substrate of the optical compensatory sheet along a direction of 45° based on the rubbing direction of the orientation layer. Polarization of transmitted light was analyzed (Multi Chanel Photo Analizer, Ohtsuka Electronics Co., Ltd.). As a result, the twist angle was in the range of 230° to 250°.

Another optical compensatory sheet was prepared in the same manner except that the discotic liquid crystal compound (2), which functions as a chiral agent was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 70° to 85°.

Further, an antiparallel cell was prepared by using a horizontal orientation layer. The discotic liquid crystal compounds (1) and (2) were inserted into the antiparallel cell. The retardation in plane (Re) of the obtained liquid crystal cell was measured by using an ellipsometer. The retardation was divided by the thickness of the cell to determine Δn of 0.07.

EXAMPLE 8

An optical compensatory sheet was prepared and evaluated in the same manner as in Example 7, except that a denatured polyvinyl alcohol (PV125) was used in place of the denatured polyvinyl alcohol (PV101). The average inclined angle of the discotic liquid crystal molecules was 70°.

Denatured polyvinyl alcohol (PV125)

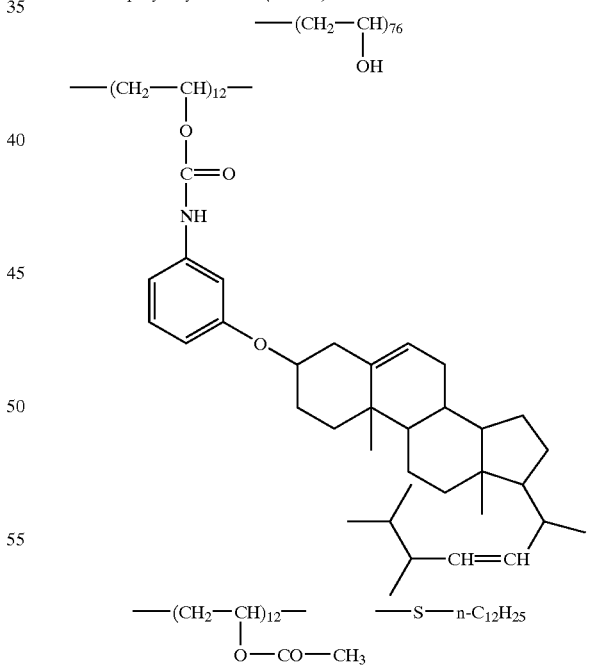

EXAMPLE 9

An optical compensatory sheet was prepared and evaluated in the same manner as in Example 7, except that a denatured polyvinyl alcohol (PV140) was used in place of the denatured polyvinyl alcohol (PV101). The average inclined angle of the discotic liquid crystal molecules was 60°.

Denatured polyvinyl alcohol (PV140)

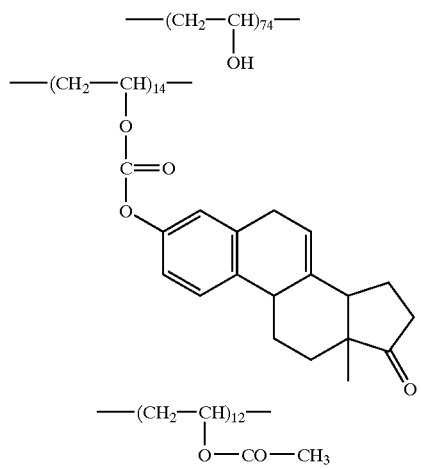

EXAMPLE 10

An optical compensatory sheet was prepared and evaluated in the same manner as in Example 7, except that a denatured polyvinyl alcohol (PV153) was used in place of the denatured polyvinyl alcohol (PV101). The average inclined angle of the discotic liquid crystal molecules was 75°.

Denatured polyvinyl alcohol (PV153)

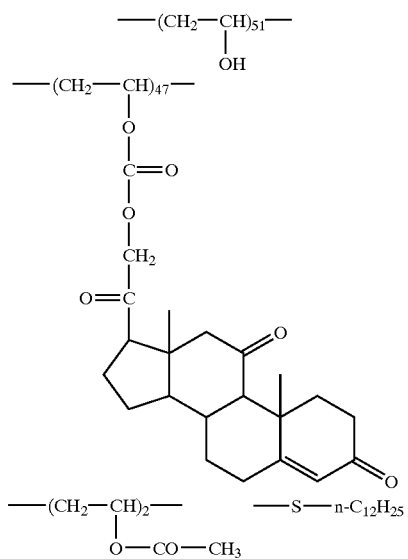

EXAMPLE 11

A liquid crystal display of an STN mode shown in FIG. 3(e) was prepared by using an optical compensatory sheet prepared in Example 7. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more. Further, a blue or yellow color was not observed in the displayed image.

EXAMPLE 12

An optical compensatory sheet was prepared and evaluated in the same manner as in Example 7, except that the following coating solution optically anisotropic layer was used. The results were the same as the results of Example 7.

| Coating solution for optically anisotropic layer | |
|---|---|
| The discotic liquid crystal compound (3) used in Example 6 | 63 weight parts |
| The discotic liquid crystal compound (2) used in Example 1 | 22 weight parts |
| The polymerizable plasticizer used in Example 6 | 10 weight parts |
| A photopolymerization initiator (Irgacure 907, Ciba-Geigy) | 1 weight part |
| Cellulose acetate butyrate (CAB551-0.2, Eastman Chemical) | 0.5 weight part |
| Methyl ethyl ketone | 184.5 weight parts |

EXAMPLE 13

A triacetyl cellulose film (thickness: 100 μm, size: 270 mm×100 mm, Fuji Tac, Fuji Photo Film Co., Ltd.) was used as a transparent substrate.

A denatured polyvinyl alcohol (PV201) containing fluorine atoms was dissolved in a mixture of methanol and water (volume ratio: 50/50) to prepare a 5 wt. % solution. The solution was coated on the transparent substrate by using a bar coater (thickness: 1 μm), and air-dried at 60° C. for 2 minutes. The surface was subjected to a rubbing treatment to form an orientation layer.

Denatured polyvinyl alcohol (PV201)

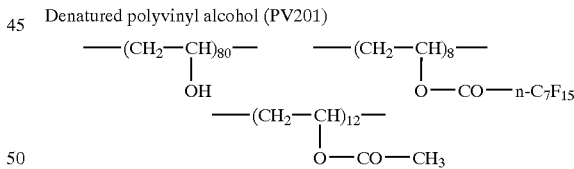

An optically anisotropic layer was formed on the orientation layer in the same manner as in Example 1 to prepare an optical compensatory sheet.

Polarized light was incident on the transparent substrate of the optical compensatory sheet along a direction of 45° based on the rubbing direction of the orientation layer. Polarization of transmitted light was analyzed (Multi Chanel Photo Analizer, Ohtsuka Electronics Co., Ltd.). As a result, the twist angle was in the range of 230° to 250°.

Another optical compensatory sheet was prepared in the same manner except that the discotic liquid crystal compound (2), which functions as a chiral agent was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 70° to 85°.

Further, an antiparallel cell was prepared by using a horizontal orientation layer. The discotic liquid crystal compounds (1) and (2) were inserted into the antiparallel cell. The retardation in plane (Re) of the obtained liquid crystal cell was measured by using an ellipsometer. The retardation was divided by the thickness of the cell to determine Δn of 0.07.

EXAMPLE 14

An optical compensatory sheet was prepared and evaluated in the same manner as in Example 13, except that a denatured polyvinyl alcohol (PV251) was used in place of the denatured polyvinyl alcohol (PV201). The average inclined angle of the discotic liquid crystal molecules was 70°.

Denatured polyvinyl alcohol (PV251)

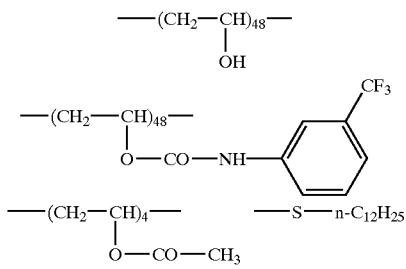

EXAMPLE 15

An optical compensatory sheet was prepared and evaluated in the same manner as in Example 13, except that a denatured polyvinyl alcohol (PV207) was used in place of the denatured polyvinyl alcohol (PV201). The average inclined angle of the discotic liquid crystal molecules was 60°.

Denatured polyvinyl alcohol (PV207)

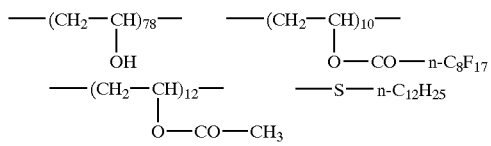

EXAMPLE 16

An optical compensatory sheet was prepared and evaluated in the same manner as in Example 13, except that a denatured polyvinyl alcohol (PV216) was used in place of the denatured polyvinyl alcohol (PV201). The average inclined angle of the discotic liquid crystal molecules was 75°.

Denatured polyvinyl alcohol (PV216)

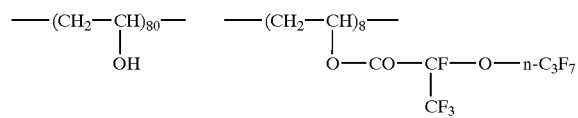

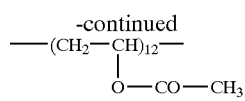

EXAMPLE 17

A liquid crystal display of an STN mode shown in FIG. 3(e) was prepared by using an optical compensatory sheet prepared in Example 13. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more. Further, a blue or yellow color was not observed in the displayed image.

EXAMPLE 18

An optical compensatory sheet was prepared and evaluated in the same manner as in Example 13, except that the following coating solution optically anisotropic layer was used. The results were the same as the results of Example 13.

| Coating solution for optically anisotropic layer | |
|---|---|
| The discotic liquid crystal compound (3) used in Example 6 | 63 weight parts |
| The discotic liquid crystal compound (2) used in Example 1 | 22 weight parts |
| The polymerizable plasticizer used in Example 6 | 10 weight parts |
| A photopolymerization initiator (Irgacure 907, Ciba-Geigy) | 1 weight part |
| Cellulose acetate butyrate (CAB551-0.2, Eastman Chemical) | 0.5 weight part |
| Methyl ethyl ketone | 184.5 weight parts |

We claim:

1. An optical compensatory sheet comprising a transparent substrate, an orientation layer and an optically anisotropic layer in order, said optically anisotropic layer comprising discotic liquid crystal molecules, wherein the orientation layer comprises a denatured polyvinyl alcohol containing fluorine atoms, said discotic liquid crystal molecules being aligned at an average inclined angle in the range of 50° to 90°.

2. The optical compensatory sheet as defined in claim 1, wherein the denatured polyvinyl alcohol comprises repeating units containing fluorine atoms in an amount of 0.05 to 80 mol %.

3. The optical compensatory sheet as defined in claim 1, wherein the discotic liquid crystal molecules are twisted at an average twist angle in the range of 90° to 360°.

4. The optical compensatory sheet as defined in claim 1, wherein the discotic liquid crystal molecules are polymerized.

5. The optical compensatory sheet as defined in claim 1, wherein the discotic liquid crystal molecules contain an asymmetric carbon atom.

6. The optical compensatory sheet as defined in claim 1, wherein the optically anisotropic layer further contains a chiral agent.

7. An orientation layer provided on a support, said orientation layer having a function of aligning liquid crystal, wherein the orientation layer comprises a denatured polyvinyl alcohol containing fluorine atoms.

8. A liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in order, said transparent substrate being adjacent to the polarizing element, said optically anisotropic layer comprising discotic liquid crystal molecules, said orientation layer comprising a denatured polyvinyl alcohol containing fluorine atoms, and said discotic liquid crystal molecules being aligned at an average inclined angle in the range of 50° to 90°.

9. A method of alignment of discotic liquid crystal molecules, which comprises forming an optically anisotropic layer comprising discotic liquid crystal molecules on an orientation layer comprising a denatured polyvinyl alcohol containing fluorine atoms to align the discotic liquid crystal molecules at an average inclined angle in the range of 50° to 90°.

* * * * *